US012762870B2

(12) United States Patent
Kuwahara et al.

(10) Patent No.: US 12,762,870 B2
(45) Date of Patent: Oct. 13, 2026

(54) DRIVER ABNORMALITY SIGN DETECTION DEVICE

(71) Applicant: Mazda Motor Corporation, Hiroshima (JP)

(72) Inventors: Junichiro Kuwahara, Hiroshima (JP); Fumito Yamano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 173 days.

(21) Appl. No.: 18/940,893

(22) Filed: Nov. 8, 2024

(65) Prior Publication Data

US 2025/0148809 A1 May 8, 2025

(30) Foreign Application Priority Data

Nov. 8, 2023 (JP) ................................ 2023-190689

(51) Int. Cl.
*G06V 20/59* (2022.01)

(52) U.S. Cl.
CPC .................................. *G06V 20/597* (2022.01)

(58) Field of Classification Search
None
See application file for complete search history.

(56) References Cited

U.S. PATENT DOCUMENTS

2019/0143989 A1* 5/2019 Oba ........................ A61B 3/113 701/70
2021/0188289 A1* 6/2021 Oba ........................ G08G 1/16
2021/0316736 A1* 10/2021 Iwase .................... B60W 40/09
2021/0398562 A1* 12/2021 Verbeke ................. B60K 35/10
2023/0222816 A1* 7/2023 Shinozaki ................ A61B 3/14 382/103
2024/0005677 A1* 1/2024 Shinozaki ............ B60W 40/08
2024/0071108 A1* 2/2024 Edwards ............... B60W 40/08

FOREIGN PATENT DOCUMENTS

JP 2021-077140 A 5/2021

* cited by examiner

*Primary Examiner* — Michael J Hess
(74) *Attorney, Agent, or Firm* — XSENSUS LLP

(57) ABSTRACT

A driver abnormality sign detection device includes a control circuit configured to detect an abnormality sign of a driver based on visual line information acquired from a visual line detector and on image data from a vehicle-outside camera. The control circuit is configured to acquire reference saccades of the driver, calculate dispersion of a section including a peak of saliency in a visual field of the driver based on the image data, calculate predicted saccades by correcting the reference saccades with correction values acquired based on the dispersion of the section including the peak of the saliency, and detect presence or absence of the abnormality sign of the driver based on a visual line abnormality degree representing an extent that measured saccades diverge from the predicted saccades.

7 Claims, 12 Drawing Sheets

(a)

LARGE DISPERSION AND HIGH RESOLUTION (b)

LARGE DISPERSION AND LOW RESOLUTION (c)

SMALL DISPERSION AND HIGH RESOLUTION (d)

SMALL DISPERSION AND LOW RESOLUTION

DRIVER ABNORMALITY SIGN DETECTION DEVICE

CROSS-REFERENCE TO RELATED APPLICATION

The present application claims priority to Japanese application number 2023-190689 filed in the Japanese Patent Office on Nov. 8, 2023, the entire contents of which are incorporated herein by reference.

TECHNICAL FIELD

The present disclosure relates to a driver abnormality sign detection device for detecting an abnormality sign of a driver in driving of a vehicle.

BACKGROUND ART

In recent years, development of a driver abnormality handling system which detects abnormality in a case where a driver falls into a state where the driver cannot safely drive and which automatically stops a vehicle has been progressing. For example, it is assumed that in a case where abnormality of the driver is detected by detecting collapse of a posture of the driver, the vehicle is gradually decelerated while staying on a lane, and if possible, the vehicle is controlled to pull over to a road shoulder or the like and is automatically stopped.

In order to safely stop the vehicle while avoiding lane deviation, contact with an obstacle, and so forth in an occurrence of abnormality of the driver, it is preferable to shorten, as much as possible, a time from the occurrence of abnormality of the driver to the detection while preventing misdetection. Accordingly, a vehicle control device has been suggested which aims to enhance precision of a determination about abnormality of a driver (for example, see Patent Literature 1). In the device disclosed in Patent Literature 1, saliency in a position to which a visual line of the driver is directed is calculated, and a determination about a state of the driver is made based on a tendency in which the visual line of the driver is attracted to a region with high saliency.

CITATION LIST

Patent Literature

[Patent Literature 1] Japanese Patent Laid-Open No. 2021-77140

SUMMARY

Problems to be Solved

In related art which is described above, in order to accurately specify an agreement degree between a direction of a visual line and a region with high saliency, high-resolution saliency distribution data have to be acquired. However, because computation for calculating a saliency distribution from image data involves a high calculation load, it is difficult, with computation resources of an in-vehicle computer, to calculate a saliency distribution with resolution sufficient for specifying the agreement degree between a visual line direction and the high-saliency region.

The present disclosure is directed to a driver abnormality sign detection device that is capable of highly precisely detecting an abnormality sign of a driver, even with limited computation resources, taking into consideration an influence of a saliency distribution on motion of a visual line of the driver.

Means for Solving the Problems

For solving the above-described problems, the present disclosure provides a driver abnormality sign detection device detecting an abnormality sign of a driver driving a vehicle, the driver abnormality sign detection device comprising a control circuit configured to detect the abnormality sign of the driver based on visual line information acquired from a visual line detectorand on image data acquired from the vehicle-outside camera. The control circuit is configured to acquire a reference saccade frequency and/or a reference saccade amplitude of the driver, calculate dispersion of a section including a peak of saliency in a saliency distribution in a visual field of the driver based on the image data, acquire correction values for correcting the reference saccade frequency and/or the reference saccade amplitude based on the dispersion of the section including the peak of the saliency, calculate a predicted saccade frequency and/or a predicted saccade amplitude by correcting the reference saccade frequency and/or the reference saccade amplitude with the correction values, calculate a visual line abnormality degree which represents an extent that a measure saccade frequency and/or a measured saccade amplitude acquired based on the visual line information diverge from the predicted saccade frequency and/or the predicted saccade amplitude, and detect, based on the visual line abnormality degree, presence or absence of the abnormality sign of the driver.

Accordingly, because the control circuit acquires the predetermined reference values of the saccade frequency and/or amplitude of the driver, calculates the dispersion of the section including the peak of the saliency in the saliency distribution in the visual field of the driver based on the image data acquired from the vehicle-outside camera, corrects the reference values with the correction values acquired based on the dispersion of the section including the peak of the saliency, and thereby calculates the prediction values of the saccade frequency and/or amplitude, without calculating saliency distribution data with high resolution as in a case where an agreement degree between a direction of the visual line and a region with high saliency is specified, a prediction value of motion of the visual line in consideration of an influence of the saliency distribution on the motion of the visual line of the driver can be obtained. Accordingly, even with limited computation resources, how much an actual measurement value of the motion of the visual line diverges from the prediction value of the motion of the visual line of the driver in a healthy state can accurately be grasped, and the abnormality sign of the driver can more highly precisely be detected based on a grasped state of the motion of the visual line.

The correction values may be set to correct the reference values further in a direction in which the reference values increase as the dispersion of the section including the peak of the saliency becomes larger.

Accordingly, the predicted motion of the visual line in consideration of a tendency in which saccades of the driver increase in a case where the dispersion of the saliency becomes larger can be obtained. Thus, the abnormality sign of the driver can highly precisely be detected.

In an embodiment, the correction value may be set so as to correct the reference value further in a direction in which the reference value of the saccade frequency increases as the dispersion of the section including the peak of the saliency becomes larger, and the control circuit may be configured to acquire the reference saccade frequency and calculate the predicted saccade frequency by correcting the reference saccade frequency with the correction value.

When the correction value is set so as to correct the reference value further in the direction in which the reference value of the saccade frequency increases as the dispersion of the section including the peak of the saliency becomes larger and the control circuit corrects the reference value of the saccade frequency with the correction value and thereby calculates the prediction value of the saccade frequency, the prediction value of the motion of the visual line in consideration of a tendency in which the saccade frequency of the driver increases in a case where the dispersion of the saliency becomes larger can be obtained. Accordingly, the abnormality sign of the driver can highly precisely be detected.

In an embodiment, the controller may acquire a reference saccade frequency and a reference saccade amplitude of the driver, calculate a predicted saccade frequency and a predicted saccade amplitude by correcting the reference saccade frequency and a reference saccade amplitude with the correction values, accumulate two-dimensional data in which a difference between the a measured saccade frequency and the predicted saccade frequency is set as a first variable and a difference between the a measured saccade amplitude and the predicted saccade amplitude is set as a second variable, and calculate the visual line abnormality degree based on a Mahalanobis distance between a newest data point of the two-dimensional data and a centroid of a set of the accumulated two-dimensional data.

When the controller accumulates the two-dimensional data, in which the difference between the actual measurement value and the prediction value of the saccade frequency is set as the first variable and the difference between the actual measurement value and the prediction value of the saccade amplitude is set as the second variable, and calculates the visual line abnormality degree based on the Mahalanobis distance between the newest data point of the two-dimensional data and the centroid of the set of the accumulated two-dimensional data, a divergence degree of the motion of the visual line from the healthy state can comprehensively be represented by one index. Consequently, even at a sufficiently early stage before the driver reaches the abnormality state where driving is difficult, such as a stage at which lowering of driving functions of the driver cannot be detected only with either one of the saccade frequency and amplitude, the abnormality sign can early and highly precisely be detected.

Advantageous Effects

A driver abnormality sign detection device according to the present disclosure can highly precisely detect an abnormality sign state of a driver, even with limited computation resources, taking into consideration an influence of a saliency distribution on motion of a visual line of the driver.

DETAILED DESCRIPTION

A driver abnormality sign detection device according to the present disclosure will hereinafter be described with reference to the attached drawings. [System Configuration]

Figure 1:
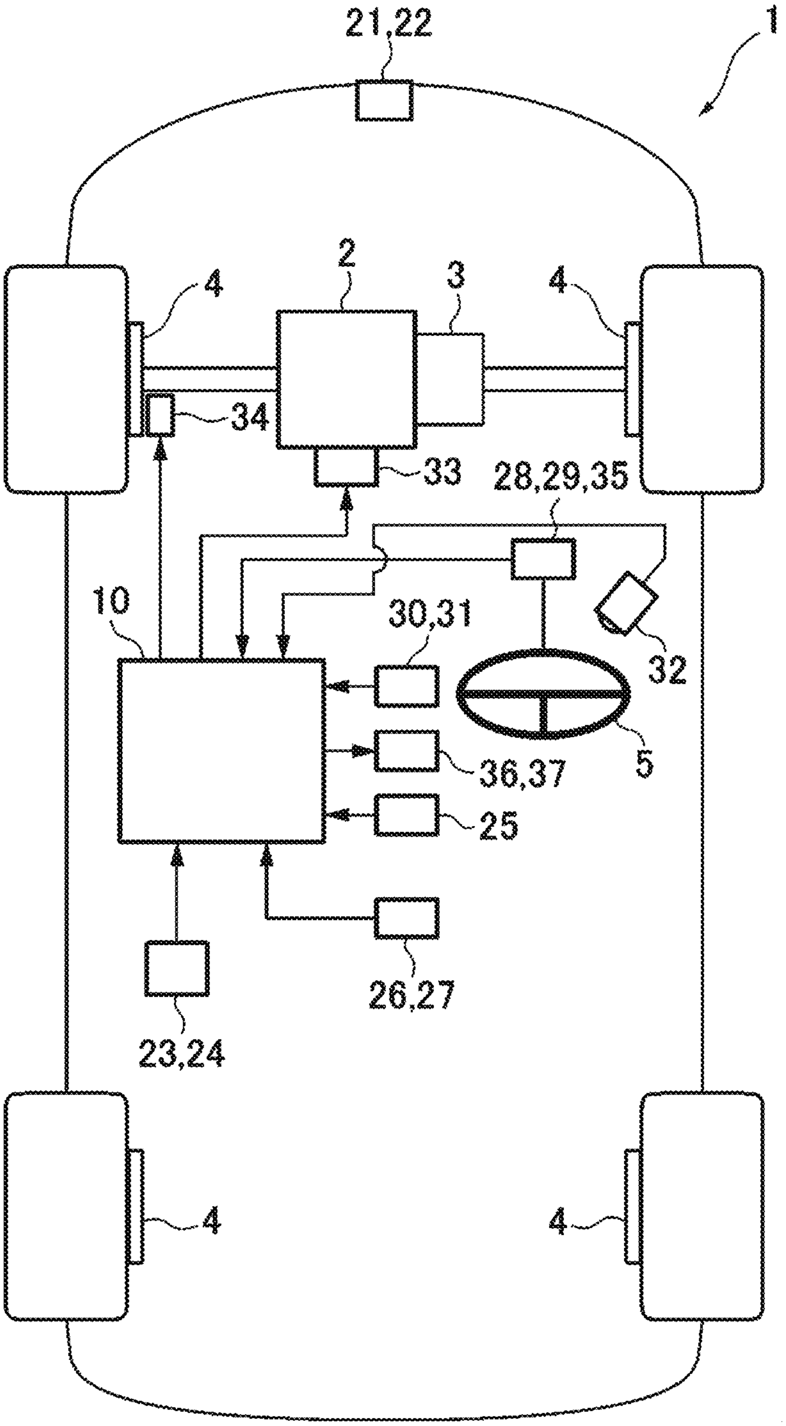
FIG. 1 is an explanatory diagram of a vehicle on which a driver abnormality sign detection device according to an embodiment is mounted.
Figure 2:
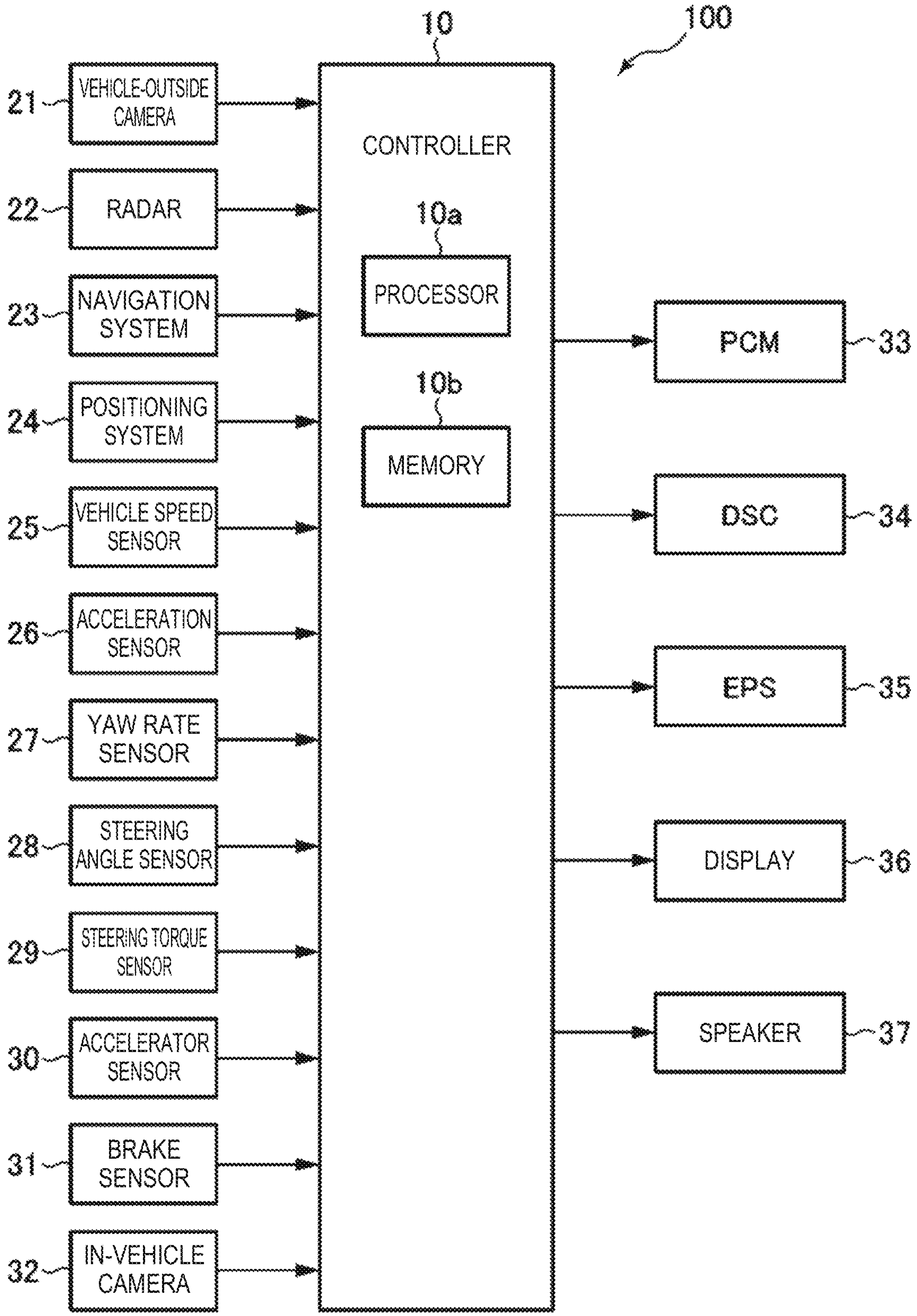
FIG. 2 is a block diagram of the driver abnormality sign detection device according to the embodiment.

First, a configuration of the driver abnormality sign detection device according to the present embodiment will be described with reference to FIG. 1 and FIG. 2. FIG. 1 is an explanatory diagram of a vehicle on which the driver abnormality sign detection device is mounted, and FIG. 2 is a block diagram of the driver abnormality sign detection device.

A vehicle 1 according to the present embodiment includes a driving force source 2 such as an engine or an electric motor which outputs driving force, a transmission 3 which transmits the driving force output from the driving force source 2 to driving wheels, brakes 4 which exert braking force on the vehicle 1, and a steering device 5 for steering the vehicle 1.

A driver abnormality sign detection device 100 is configured to detect an abnormality sign of a driver of the vehicle 1 and to perform control of the vehicle 1 and driving assistance control as needed. As illustrated in FIG. 2, the driver abnormality sign detection device 100 has a controller 10, a plurality of sensors, a plurality of control systems, and a plurality of information output devices. The controller 10 described herein may be implemented using computer programming or engineering techniques including computer software, firmware, hardware or any combination or subset thereof. For example, the controller 10 may be non-transitory computer readable storage device having computer readable instructions that when executed by circuitry cause the circuitry to perform the methods described herein, may be circuits to performs the methods described herein, or a combination thereof.

Specifically, the plurality of sensors include a vehicle-outside camera 21 and a radar 22, which acquires traveling environment information of the vehicle 1, and a navigation system 23 and a positioning system 24, which are for detecting a position of the vehicle 1. Further, the plurality of sensors include a vehicle speed sensor 25, an acceleration sensor 26, a yaw rate sensor 27, a steering angle sensor 28, a steering torque sensor 29, an accelerator sensor 30, and a brake sensor 31, which are for detecting behavior of the vehicle 1 and a driving operation by the driver. Further, the plurality of sensors include an in-vehicle camera 32 for detecting a visual line of the driver. The plurality of control systems include a power train control module (PCM) 33 which controls the driving force source 2 and the transmission 3, a dynamic stability control system (DSC) 34 which controls the driving force source 2 and the brakes 4, and an electric power steering system (EPS) 35 which controls the steering device 5. The plurality of information output devices include a display 36 which outputs image information and a speaker 37 which outputs sound information.

Further, as other sensors, a periphery sonar which measures a distance to and a position of a peripheral structure with respect to the vehicle 1, corner radars which measures approach of peripheral structures to four corner portions of the vehicle 1, and various sensors which detect a state of the driver (for example, a heart rate sensor, an electrocardiogram sensor, a gripping force sensor of a steering wheel, and so forth) may be included.

The controller 10 executes various kinds of computation based on signals received from the plurality of sensors, transmits control signals for causing the driving force source 2, the transmission 3, the brakes 4, and the steering device 5 to appropriately act to the PCM 33, the DSC 34, and the EPS 35, and transmits, to the display 36 and the speaker 37, control signals for causing the display 36 and the speaker 37 to output desired information. The controller 10 is configured with a computer which includes one or more processors 10*a* (typically, a CPU), a memory 10*b* (such as a ROM or a RAM) which stores various programs and data, an input-output device, and so forth.

The vehicle-outside camera 21 photographs surroundings of the vehicle 1 and outputs image data. Based on the image data received from the vehicle-outside camera 21, the controller 10 specifies positions and speeds of target objects (such as a preceding vehicle, a parked vehicle, a pedestrian, a traveling road, marking lines (a lane boundary line, a white line, and a yellow line), a traffic signal, a traffic sign, a stop line, an intersection, and an obstacle, for example). Note that the vehicle-outside camera 21 corresponds to one example of a "visual line parameter information acquisition device" in the present disclosure.

The radar 22 measures a position and a speed of a target object (particularly, such as a preceding vehicle, a parked vehicle, a pedestrian, or a fallen object on a traveling road). As the radar 22, for example, a millimeter wave radar can be used. The radar 22 transmits an electric wave in a moving direction of the vehicle 1 and receives a reflected wave resulting from reflection of a transmitted wave by the target object. Furthermore, based on the transmitted wave and the received wave, the radar 22 measures a distance between the vehicle 1 and the target object (for example, an inter-vehicular distance) or a relative speed of the target object with respect to the vehicle 1. Note that in the present embodiment, the distance to or the relative speed of the target object may be measured by using a laser radar, an ultrasonic sensor, or the like instead of the radar 22. Further, a position-and-speed measurement device may be configured by using the plurality of sensors.

The navigation system 23 stores map information in its internal portion and can provide the map information to the controller 10. Based on the map information and present vehicle position information, the controller 10 specifies a road, an intersection, a traffic signal, a building, or the like which is present in surroundings (particularly, in the moving direction) of the vehicle 1. The map information may be stored in the controller 10. The positioning system 24 is a GPS system and/or a gyro system and detects a position (present vehicle position information) of the vehicle 1.

The vehicle speed sensor 25 detects a speed of the vehicle 1 based on a rotational speed of a vehicle wheel or a drive shaft, for example. The acceleration sensor 26 detects accelerations of the vehicle 1. The accelerations include an acceleration in a front-rear direction of the vehicle 1 and an acceleration in a lateral direction (in other words, a lateral acceleration). Note that in the present specification, accelerations include not only a change rate of a speed in a direction in which the speed increases but also a change rate of the speed in a direction in which the speed decreases (in other words, deceleration). The yaw rate sensor 27 detects a yaw rate of the vehicle 1. Note that the vehicle speed sensor 25 corresponds to one example of the "visual line parameter information acquisition device" in the present disclosure.

The steering angle sensor 28 detects a rotation angle (steering angle) of the steering wheel of the steering device 5. The steering torque sensor 29 detects torque (steering torque) applied to a steering shaft via the steering wheel. The accelerator sensor 30 detects a pedaling amount of an accelerator pedal. The brake sensor 31 detects a pedaling amount of a brake pedal. That is, the steering angle sensor 28, the steering torque sensor 29, the accelerator sensor 30, and the brake sensor 31 detect the driving operation by the driver, and the steering angle sensor 28 corresponds to one example of the "visual line parameter information acquisition device" in the present disclosure.

The in-vehicle camera 32 photographs the driver and outputs image data. The controller 10 detects behavior of a head of the driver and a visual line direction based on the image data received from the in-vehicle camera 32. Note that the in-vehicle camera 32 corresponds to one example of a "visual line detection device" and the "visual line parameter information acquisition device" in the present disclosure.

The PCM 33 controls the driving force source 2 of the vehicle 1 and adjusts the driving force of the vehicle 1. For example, the PCM 33 controls a spark plug, a fuel injection valve, a throttle valve, and a variable valve mechanism of the engine, the transmission 3, an inverter which supplies electric power to the electric motor, and so forth. In a case where the vehicle 1 has to be accelerated or decelerated, the controller 10 transmits a control signal to the PCM 33 for adjusting the driving force.

The DSC 34 controls the driving force source 2 and the brakes 4 of the vehicle 1 and performs deceleration control and posture control for the vehicle 1. For example, the DSC 34 controls a liquid pressure pump and a valve unit of each of the brakes 4 and controls the driving force source 2 via the PCM 33. In a case where the deceleration control or the posture control for the vehicle 1 has to be performed, the controller 10 transmits a control signal to the DSC 34 for adjusting the driving force or for generating braking force.

The EPS 35 controls the steering device 5 of the vehicle 1. For example, the EPS 35 controls an electric motor or the like which exerts torque on the steering shaft of the steering device 5. In a case where the moving direction of the vehicle 1 has to be changed, the controller 10 transmits a control signal to the EPS 35 for changing a steering direction.

The display 36 is provided in front of the driver in a vehicle cabin and displays the image information to the driver. As the display 36, for example, a liquid crystal display or a head-up display is used. The speaker 37 is installed in the vehicle cabin and outputs various kinds of sound information.

Outline of Driver Abnormality Sign Detection

Figure 3:
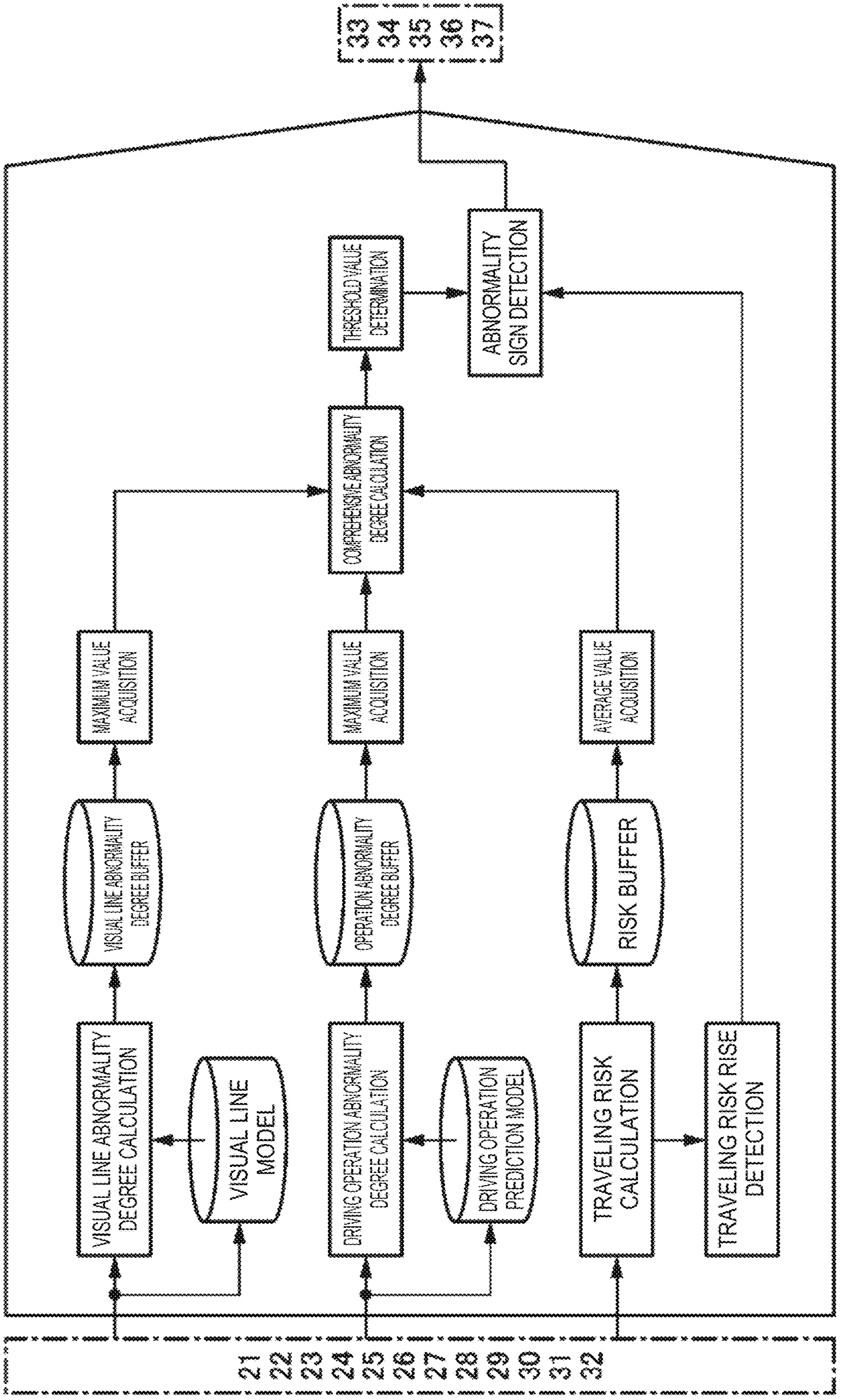
FIG. 3 is a control block diagram of abnormality sign detection according to the embodiment.

Next, a description will be made, with reference to FIG. 3, about a basic concept of driver abnormality sign detection which is executed by the controller 10 described above in the present embodiment. FIG. 3 is a control block diagram of the abnormality sign detection according to the present embodiment.

In the abnormality sign before the driver reaches an abnormality state where driving is difficult, it is considered that driving functions of the driver at least temporarily start lowering due to a mild disease, aging, or the like. When the driving functions of the driver lower, in response to that, changes occur to driving actions by the driver, for example, a checking action for checking a traveling environment and an operation action for performing the driving operation of the vehicle. In addition, it is considered that as a result of the changes in the driving actions, a risk (traveling risk) such as lane deviation or approach to an obstacle rises. Accordingly, the present inventors considered that by making a comprehensive determination about the changes in the driving actions and a rise of the traveling risk, early and highly precisely detection of the abnormality sign without detecting obvious lowering of individual driving functions is possible.

Here, the driving functions of the driver include perception functions for perceiving a target object which is present in the traveling environment and attention functions such as a function for simultaneously seeing a plurality of target objects in the traveling environment (divided attention function), a function for selectively seeing a target object from the plurality of target objects (selective attention function), a function for switching target objects (attention shifting function), and a function for continuing to see a target object (sustained attention function). Further, the driving functions of the driver also include motor functions which are necessary for operating the steering wheel, the accelerator pedal, the brake pedal, and so forth of the vehicle 1.

As a result of a study by the present inventors, knowledge has been obtained that when the perception functions, the attention functions, or the motor functions lower, as a change in the checking action of the driver, a change occurs to motion of the visual line. For example, when the perception functions lower due to visual field deficiency or the like, a range in which the visual line is moved might become narrow. Further, when the attention functions lower, a frequency of motion of the visual line lowers, and a movement distance of the visual line becomes short. In addition, when the motor functions lower due to a paralysis of a hand or a foot, because the driver is concerned about a condition of the paralyzed hand or foot, the driver might direct the visual line in a direction of the paralyzed hand or foot. Consequently, an abnormality degree of the motion of the visual line of the driver is obtained while the motion of the visual line, which corresponds to the traveling environment and a vehicle state, in a state where no disease or abnormality is present (healthy or unimpaired state) is set as a reference, and the change in the checking action due to lowering of the perception functions, the attention functions, or the motor functions of the driver can thereby be grasped.

Further, as a result of a study by the present inventors, knowledge has also been obtained that when the perception functions, the attention functions, or the motor functions lower, as changes in the operation action of operating the steering wheel, the accelerator pedal, and the brake pedal, changes occur to operations of the steering wheel, the accelerator pedal, and the brake pedal. For example, when the motor functions lower, a delay might occur to an operation of the steering wheel or an operation of the pedal compared to the healthy state. Further, because when the perception functions or the attention functions lower, traveling environment recognition of the driver as a base of the driving operation is influenced, the operation of the steering wheel or the operation of the pedal might become unstable compared to a case of the healthy state due to the fact that the position of the own vehicle in a lane cannot be grasped well, the fact that a delay of finding of or an oversight of the target object occurs, or the like, for example. Consequently, the abnormality degree of the driving operation by the driver is obtained while the driving operation, which corresponds to the traveling environment and the vehicle state, in the healthy state is set as a reference, and the change in the operation action due to lowering of the perception functions, the attention functions, or the motor functions of the driver can thereby be grasped.

Further, in a case where the perception functions, the attention functions, or the motor functions of the driver lower, the traveling risk such as the lane deviation or approach to the obstacle rises due to an occurrence of the delay of finding of or the oversight of the target object or an unstable driving operation. According to the study by the present inventors, as for the driver in the healthy state, even when the traveling risk temporarily rises due to carelessness or unsteadiness of the operation, an appropriate correction operation is thereafter performed, and the traveling risk thus immediately lowers. Consequently, an average value of the traveling risk is maintained at a low level. On the other hand, because it gradually becomes difficult for the driver whose driving functions have lowered to perform the driving operation for lowering the traveling risk, the traveling risk progressively rises. As a result, the average value of the traveling risk reaches a higher level than that of a healthy person, and further a rising tendency of the traveling risk is retained. Consequently, the average value of and the rising tendency of the traveling risk are obtained, and an influence of the changes in the driving actions due to lowering of the motor functions, the perception functions, or the attention functions of the driver can thereby be grasped.

Accordingly, based on the visual line of the driver, the driving operation, the traveling environment of the vehicle 1, and so forth, the controller 10 of the present embodiment calculates an abnormality degree of the visual line of the driver (visual line abnormality degree), an abnormality degree of the driving operation of the driver (driving operation abnormality degree), and the traveling risk. Furthermore, the controller 10 is configured to calculate a comprehensive abnormality degree of the state of the driver (comprehensive abnormality degree) based on those visual line abnormality degree, driving operation abnormality degree, and traveling risk and to detect the abnormality sign of the driver based on the comprehensive abnormality degree.

Specifically, as illustrated in FIG. 3, the controller 10 acquires visual line information based on a signal received from the in-vehicle camera 32, acquires driving operation information based on signals received from the steering angle sensor 28, the steering torque sensor 29, the accelerator sensor 30, and the brake sensor 31, and acquires traveling environment information and vehicle state information based on signals received from the sensors including the vehicle-outside camera 21, the radar 22, the navigation system 23, the positioning system 24, the vehicle speed sensor 25, the acceleration sensor 26, and the yaw rate sensor 27. Further, the controller 10 calculates a visual line parameter based on signals received from the vehicle-outside camera 21, the vehicle speed sensor 25, the steering angle sensor 28, and the in-vehicle camera 32.

The controller 10 inputs a predetermined reference feature amount, which represents the motion of the visual line, and the calculated visual line parameter to a visual line model 104 and calculates a prediction value of the motion of the visual line in the driver in the healthy state (predicted visual line). As the feature amount representing the motion of the visual line, for example, an amplitude or a frequency of a saccade can be used.

Here, the saccade denotes a saccadic eye movement for catching a visual target in the central fovea of the retina and denotes eye movement in which the visual line is moved from a gaze point, at which the visual line becomes still for a predetermined time, to a next gaze point. The amplitude of the saccade denotes a movement amount in a case where the visual line of the driver moves from the gaze point to the next gaze point, and the frequency of the saccade denotes the number of occurrences of movement from the gaze point to the next gaze point in a predetermined time.

The motion of the visual line is influenced by a steering operation by the driver, the vehicle state (such as the vehicle speed, for example), the traveling environment (such as illuminance or dispersion of saliency, for example), head behavior of the driver, and so forth. Here, the saliency denotes a characteristic representing easiness of attracting a gaze of a human and denotes a visual feature amount which is decided in accordance with temporal and spatial arrangement of colors, luminance, motion, and so forth. That is, a region with high saliency in a visual field of the driver is a region which easily attracts a gaze of the driver due to a large color difference or luminance difference relative to a surrounding region or presence of large motion.

For example, in a case where the driver performs a steering operation in a situation where intersections or curves are successively present, because the driver concentrates the visual line in a direction in which the vehicle turns, dispersion of the visual line tends to decrease. Further, in a case where the vehicle speed is comparatively high on an expressway or the like, the visual line of the driver tends to be concentrated in the moving direction. Further, in a case where the illuminance of the traveling environment is comparatively low in the nighttime or the like, the visual line of the driver also tends to be concentrated in the moving direction. Further, in a case where the dispersion of the saliency in the visual field of the driver is small (in other words, a case where regions with high saliency are gathered in a partial region of the visual field of the driver), the visual line of the driver tends to be concentrated in the region with high saliency. In addition, the visual line of the driver tends to lean to a direction in which a face of the driver is directed.

Accordingly, the visual line model 104 is configured such that when parameters (visual line parameters) such as the steering operation, the vehicle state (vehicle speed), the traveling environment (dispersion of saliency and illuminance), and the head behavior (face direction) of the driver, which influence the motion of the visual line, are input, the visual line model 104 outputs the predicted visual line of the driver in the healthy state in a case where the influence of those is taken into consideration.

Figure 4:
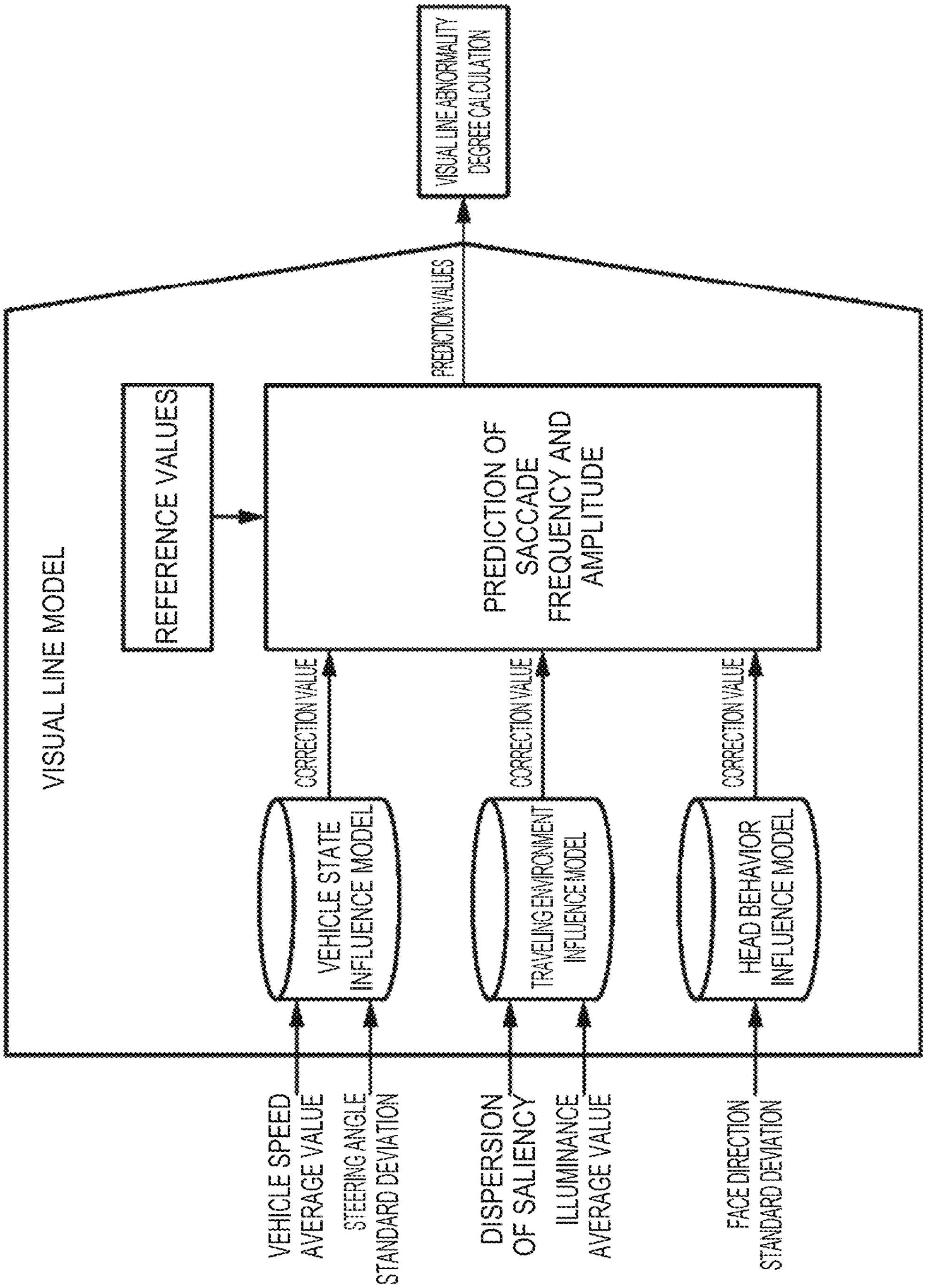
FIG. 4 is a block diagram of a visual line model according to the embodiment.

FIG. 4 is a block diagram of the visual line model according 104 to the present embodiment. As illustrated in FIG. 4, in the visual line model 104, reference values 208 of the saccade frequency and amplitude in the healthy state are set. The reference saccade frequency and saccade amplitude can be set in advance, for example, machine learning is executed for each travel of the vehicle 1, and the reference values can thereby reflect individual differences among drivers.

Further, the visual line model 104 includes a vehicle state influence model 202 for correcting the reference values based on influences of the steering operation and the vehicle state on the motion of the visual line, a traveling environment model 204 for correcting the reference values based on an influence of the traveling environment, and a head behavior influence model 206 for correcting the reference values based on an influence of the head behavior of the driver.

The vehicle state influence model 202 is configured such that when as the parameters representing the steering operation and the vehicle state, a standard deviation of an operation amount (steering angle) of the steering wheel and an average value of the vehicle speed in a predetermined time (for example, 30 seconds) are input, the vehicle state influence model 202 outputs a correction value for each of the saccade frequency and amplitude, which corresponds to the standard deviation of the steering angle and the vehicle speed average value. Specifically, in the vehicle state influence model, correction maps are set which define relationships between the standard deviation of the steering angle and the vehicle speed average value and the correction value for each of the saccade frequency and amplitude. Furthermore, when the standard deviation of the steering angle and the vehicle speed average value are input to the vehicle state influence model, based on the correction maps, the vehicle state influence model outputs the correction value for each of the saccade frequency and amplitude, which corresponds to the input standard deviation of the steering angle and the input vehicle speed average value.

Further, the traveling environment influence model 204 is configured such that when as the parameter representing the traveling environment, the dispersion of the saliency and an average value of illuminance of the traveling environment in a predetermined time (for example, 30 seconds) are input, the traveling environment influence model outputs a correction value for each of the saccade frequency and amplitude, which corresponds to the dispersion of the saliency and the illuminance average value. Specifically, in the traveling environment influence model 204, correction maps are set which define relationships between the dispersion of the saliency and the illuminance average value of the traveling environment and the correction value for each of the saccade frequency and amplitude. Furthermore, when the dispersion of the saliency and the illuminance average value of the traveling environment are input to the traveling environment influence model, based on the correction maps, the traveling environment influence model 204 outputs the correction value for each of the saccade frequency and amplitude, which corresponds to the input dispersion of the saliency and the input illuminance average value of the traveling environment.

Figure 5:
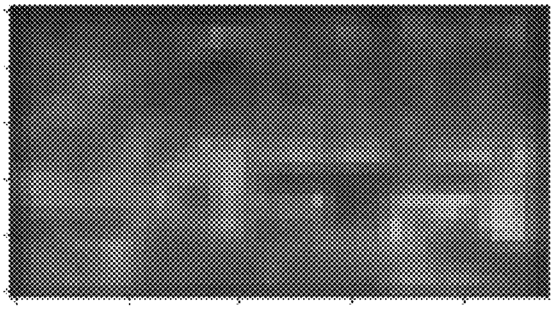
FIG. 5 is a diagram illustrating examples of saliency distributions which are acquired based on a signal output from a vehicle-outside camera according to the embodiment.
Figure 5:
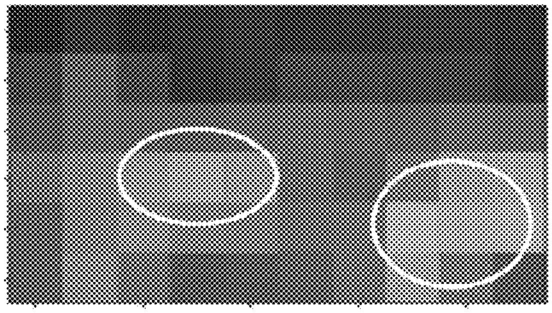
Figure 5:
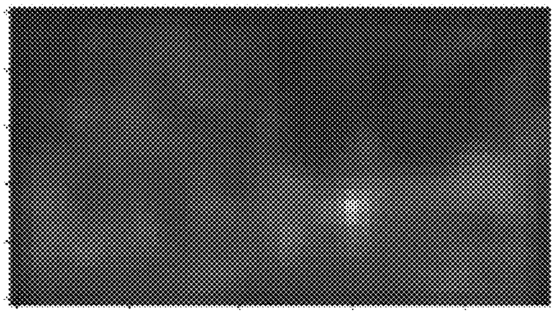
Figure 5:
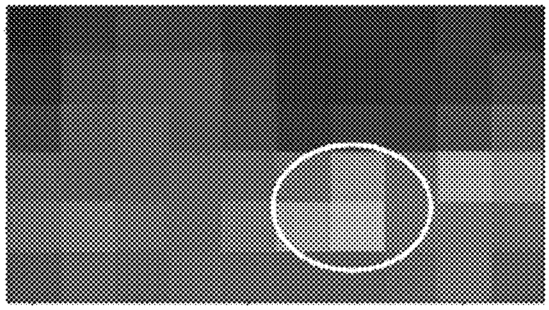

FIG. 5 is a diagram illustrating examples of saliency distributions which are acquired based on the signal output from the vehicle-outside camera 21, FIG. 5 (*a*) is a diagram in which a state where the dispersion of the saliency is large is represented by high resolution saliency distribution data, FIG. 5 (*b*) is a diagram in which the state where the dispersion of the saliency is large is represented by low resolution saliency distribution data, FIG. 5 (*c*) is a diagram in which a state where the dispersion of the saliency is small is represented by the high resolution saliency distribution data, and FIG. 5 (*d*) is a diagram in which the state where the dispersion of the saliency is small is represented by the low resolution saliency distribution data. FIG. 5 illustrates that as the color is closer to white, the saliency is higher and as the color is closer to black, the saliency is lower.

In order to specify a tendency in which the visual line of the driver is attracted to a region with high saliency as in related art, saliency distribution data with high resolution (40×30=1,200 pixels), which are raised as examples in FIG. 5 (*a*) and FIG. 5 (*c*), have to be acquired for accurately specifying an agreement degree between the direction of the visual line and the region with high saliency. However, because computation for calculating the saliency distribution from image data involves a high calculation load, it is difficult, with computation resources of an in-vehicle computer, to calculate a saliency distribution with resolution sufficient for specifying the agreement degree between the visual line direction and the high-saliency region.

Accordingly, in the present embodiment, the agreement degree between the direction of the visual line and the region with high saliency is not specified, but to calculate the predicted motion of the visual line taking into consideration an influence of the saliency distribution on the motion of the visual line of the driver, dispersion of a section with high saliency in the visual field of the driver is obtained. In this case, it is not necessary to calculate high resolution saliency distribution data as in a case where the agreement degree between the direction of the visual line and the region with high saliency is specified. For example, even the saliency distribution data with low resolution (10×6=60 pixels), which are illustrated in FIG. 5 (*b*) and FIG. 5 (*d*), have sufficient resolution for obtaining the dispersion of the section with high saliency.

Specifically, the controller 10 calculates the saliency distribution data in the visual field of the driver based on the image data acquired from the vehicle-outside camera 21. Furthermore, a scattering of coordinates of a section including a peak of saliency in the saliency distribution, for example, a section in which a level of saliency is the 75th percentile value or greater (each of sections surrounded by white circles in FIG. 5 (*b*) and FIG. 5 (*d*)) is calculated as the dispersion of the saliency. For example, because a plurality of sections which include peaks of saliency are present in FIG. 5 (*b*) but only one section which includes a peak of saliency is present in FIG. 5 (*d*), the dispersion of the saliency is larger in FIG. 5 (*b*) than FIG. 5 (*d*). When the dispersion of the saliency which is calculated in such a manner is input to the traveling environment influence model 204, based on the correction maps, the respective correction values for the saccade frequency and amplitude, which correspond to the input dispersion of the saliency, are output.

Further, the head behavior influence model 206 is configured such that when as the parameter representing the head behavior of the driver, a standard deviation of the direction of the face of the driver in a predetermined time (for example, 30 seconds) is input, the head behavior influence model 206 outputs respective correction values for the saccade frequency and amplitude, which correspond to the standard deviation of the direction of the face. Specifically, in the head behavior influence model 206, correction maps are set which define relationships between the standard deviation of the direction of the face and the respective correction values for the saccade frequency and amplitude. Furthermore, when the standard deviation of the direction of the face is input to the head behavior influence model, based on the correction maps, the head behavior influence model outputs the correction value for each of the saccade frequency and amplitude, which corresponds to the input standard deviation of the steering angle and the input vehicle speed.

Figure 6:
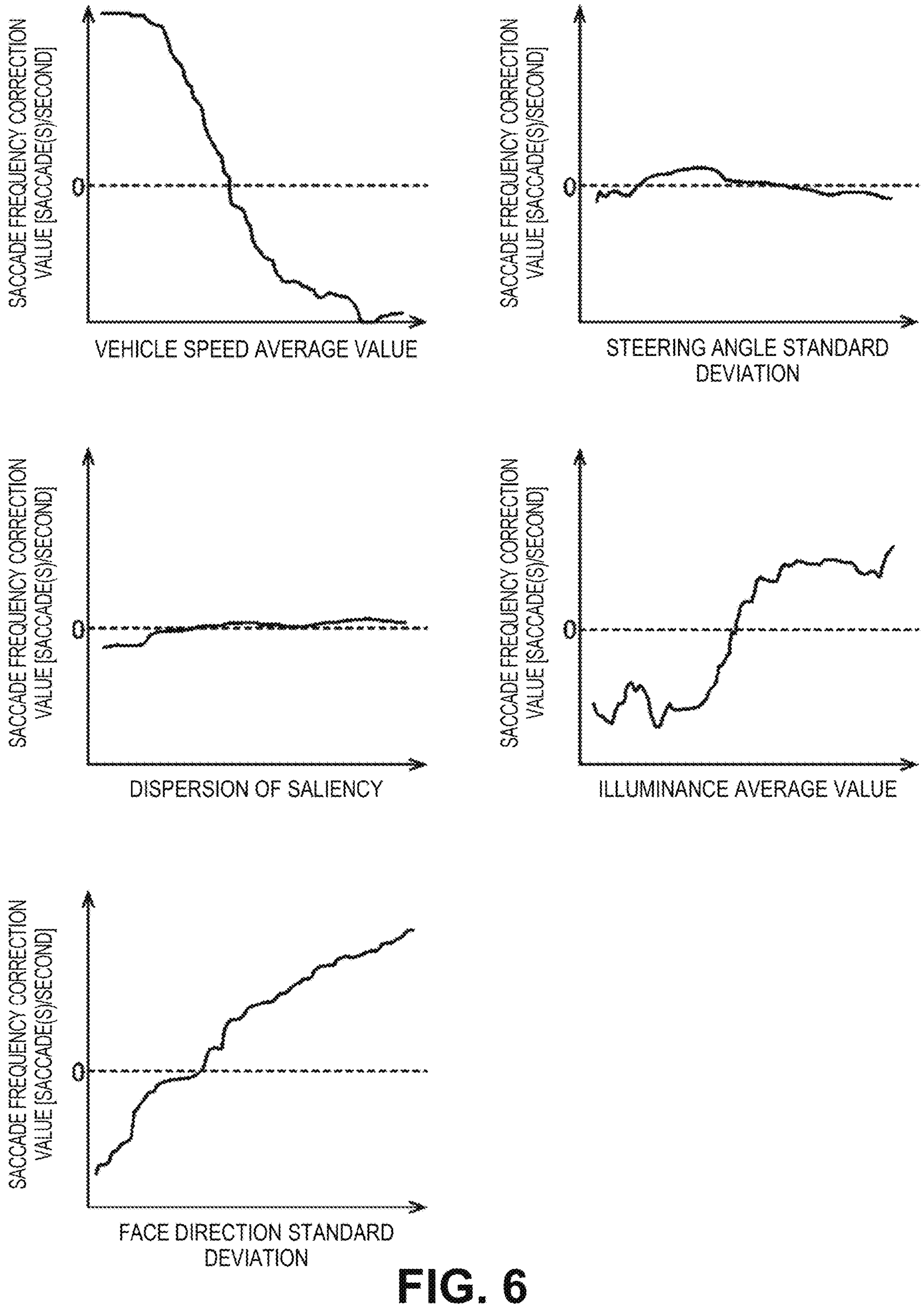
FIG. 6 is a diagram illustrating correction maps which are used for prediction value calculation of a saccade frequency in the abnormality sign detection according to the embodiment.
Figure 7:
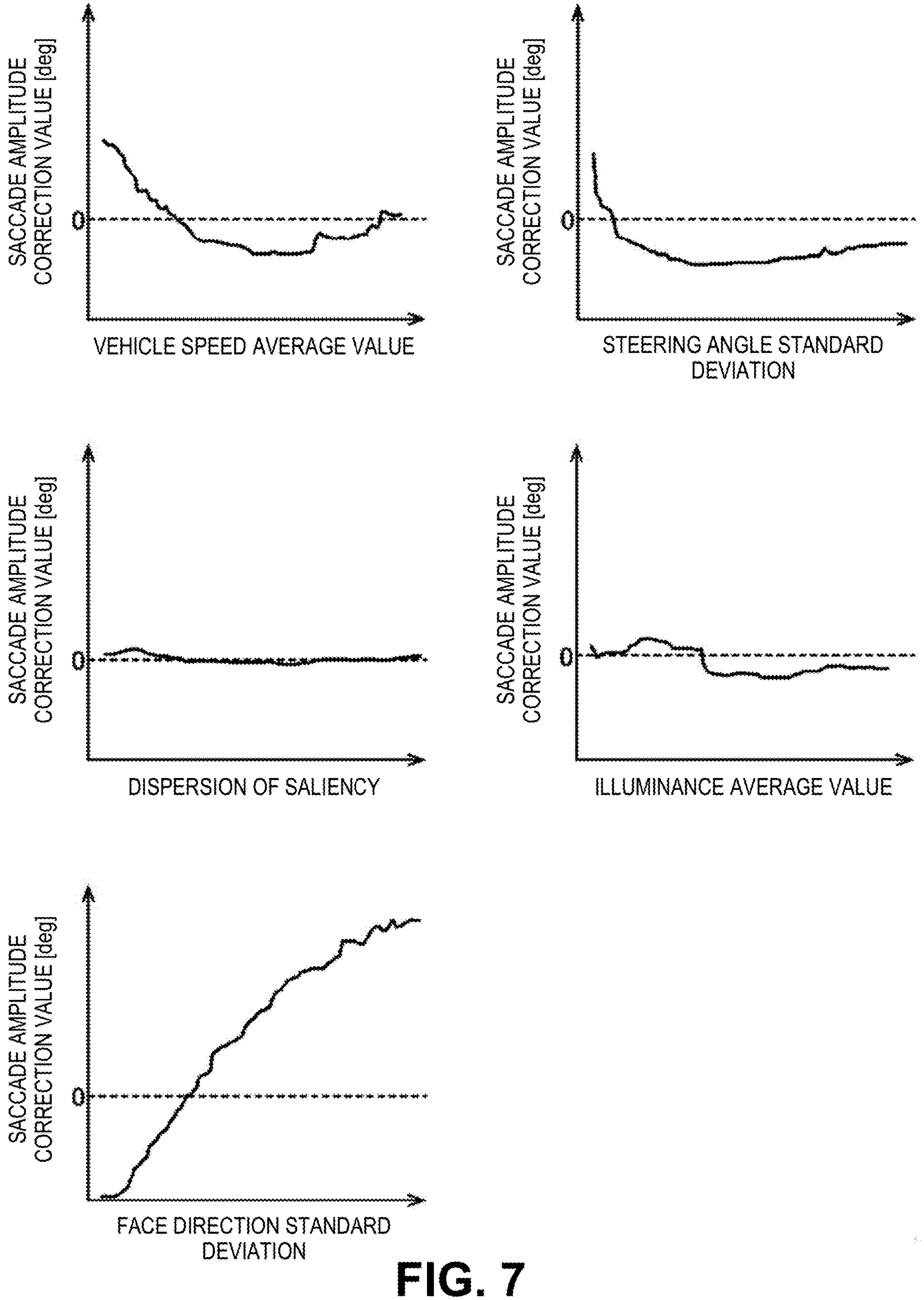
FIG. 7 is a diagram illustrating correction maps which are used for prediction value calculation of a saccade amplitude in the abnormality sign detection according to the embodiment.

Here, a description will be made, with reference to FIG. 6 and FIG. 7, about the correction maps which are set in the vehicle state influence model 202, the traveling environment influence model 204, and the head behavior influence model 206. FIG. 6 is a diagram illustrating the correction maps which are used to calculate a predicted saccade frequency. FIG. 7 is a diagram illustrating the correction maps which are used to calculate a predicted saccade amplitude. The present inventors monitored at least one hundred subjects in the healthy state driving vehicles and measured time changes in the vehicle speed average value, a steering angle standard deviation, the dispersion of the saliency, the illuminance average value, and a face direction standard deviation and time changes in the saccade frequency and amplitude. Furthermore, an influence of each of the vehicle speed average value, the steering angle standard deviation, the dispersion of the saliency, the illuminance average value, and the face direction standard deviation on the saccade frequency and amplitude was extracted by machine learning. Based on results of those, the correction maps for the saccade frequency, which are illustrated in FIG. 6, and the correction maps for the saccade amplitude, which are illustrated in FIG. 7, were created.

In the correction maps for the saccade frequency which are illustrated in FIG. 6, the horizontal axes represent magnitudes of the vehicle speed average value, the steering angle standard deviation, the dispersion of the saliency, the illuminance average value, and the face direction standard deviation, and the vertical axes represent correction values to be added to the reference value of the saccade frequency. That is, it is indicated that in a case where the correction value is larger than zero, the reference value of the saccade frequency is corrected in an increasing direction, and in a case where the correction value is smaller than zero, the reference value of the saccade frequency is corrected in a decreasing direction.

Similarly, in the correction maps for the saccade frequency which are illustrated in FIG. 7, the horizontal axes represent the magnitudes of the vehicle speed average value, the steering angle standard deviation, the dispersion of the saliency, the illuminance average value, and the face direction standard deviation, and the vertical axes represent correction values to be added to the reference value of the saccade amplitude. That is, it is indicated that in a case where the correction value is larger than zero, the reference value of the saccade amplitude is corrected in an increasing direction, and in a case where the correction value is smaller than zero, the reference value of the saccade amplitude is corrected in a decreasing direction.

Among the correction maps illustrated in FIG. 6 and FIG. 7, the correction maps about the vehicle speed average value and the steering angle standard deviation are set in the vehicle state influence model 202, the correction maps about the dispersion of the saliency and the illuminance average value are set in the traveling environment influence model 204, and the correction map about the face direction standard deviation is set in the head behavior influence model 206.

For example, as for the influence of the vehicle speed average value, as illustrated in FIG. 6, the correction value is set such that the saccade frequency becomes smaller as the vehicle speed average value becomes higher. Meanwhile, as illustrated in FIG. 7, the correction value is set such that the saccade amplitude also becomes smaller as the vehicle speed average value becomes higher but the influence on the saccade amplitude becomes smaller when the vehicle average value becomes higher to some extent. This situation is considered to indicate that the visual line of the driver tends to be concentrated in the moving direction when the vehicle speed becomes high but a width of the motion of the visual line is maintained to some extent.

Further, as for the influence of the steering operation, as illustrated in FIG. 6, the influence of the steering angle standard deviation on the saccade frequency is not large. Meanwhile, as illustrated in FIG. 7, the correction value is set such that the saccade amplitude becomes smaller as the steering angle standard deviation becomes larger but the saccade amplitude becomes gradually larger when the steering angle standard deviation becomes higher to some extent. This situation is considered to indicate that the driver directs the visual line to various target objects regardless of largeness of the steering operation but a range itself to which the visual line is directed tends to be concentrated in a direction in which the vehicle is turned by the steering operation.

Further, as for the influence of the dispersion of the saliency, as illustrated in FIG. 6, the correction value is set such that the saccade frequency gradually becomes larger as the dispersion of the saliency becomes larger. Meanwhile, as illustrated in FIG. 7, the influence of the dispersion of the saliency on the saccade amplitude is not large. This situation is considered to indicate that when sections with high saliency are widely distributed, the frequency of the motion of the visual line increases because targets to which the driver directs the visual line increase, but because targets to which the visual line is directed regardless of a high or low level of the saliency (for example, a preceding vehicle, an obstacle, and so forth) are still present, a range itself to which the visual line is directed tends not to be changed largely.

Further, as for the influence of the illuminance average value, as illustrated in FIG. 6, the correction value is set such that the saccade frequency becomes larger as the illuminance average value becomes higher. Meanwhile, as illustrated in FIG. 7, the influence of the illuminance average value on the saccade amplitude is not large. This situation is considered to indicate that because there are many targets to which the driver directs the visual line in the daytime in which the illuminance average value is high compared to the nighttime in which the illuminance average value is low, the frequency of the motion of the visual line increases, but because targets to which the visual line is directed (for example, a preceding vehicle, an obstacle, and so forth) are still present around the vehicle even in the nighttime, the range itself to which the visual line is directed tends not to be changed largely.

Further, as for the influence of the face direction standard deviation, as illustrated in FIG. 6 and FIG. 7, the correction values are set such that both of the saccade frequency and amplitude become larger as the face direction standard deviation becomes higher. This situation is considered to indicate that because the visual line of the driver leans to the direction to which the face of the driver is directed, as a frequency of motion of the face becomes higher, the frequency of the motion of the visual line tends to become higher, and the range to which the visual line is directed tends to become wider.

In the visual line model 104, the reference saccade frequency and the reference saccade amplitude in the healthy state are corrected with the correction values for the saccade frequency and amplitude which are output from the vehicle state influence model 202, the traveling environment model 204, and the head behavior influence model 206, which are configured as described above, and predicted saccade frequency and the predicted saccade amplitude are thereby calculated (prediction of the saccade frequency and amplitude 210). Accordingly, the prediction values of the saccade frequency and amplitude, which reflect the influences of the steering operation, the vehicle state, the traveling environment, and the head behavior of the driver, are output.

Figure 8:
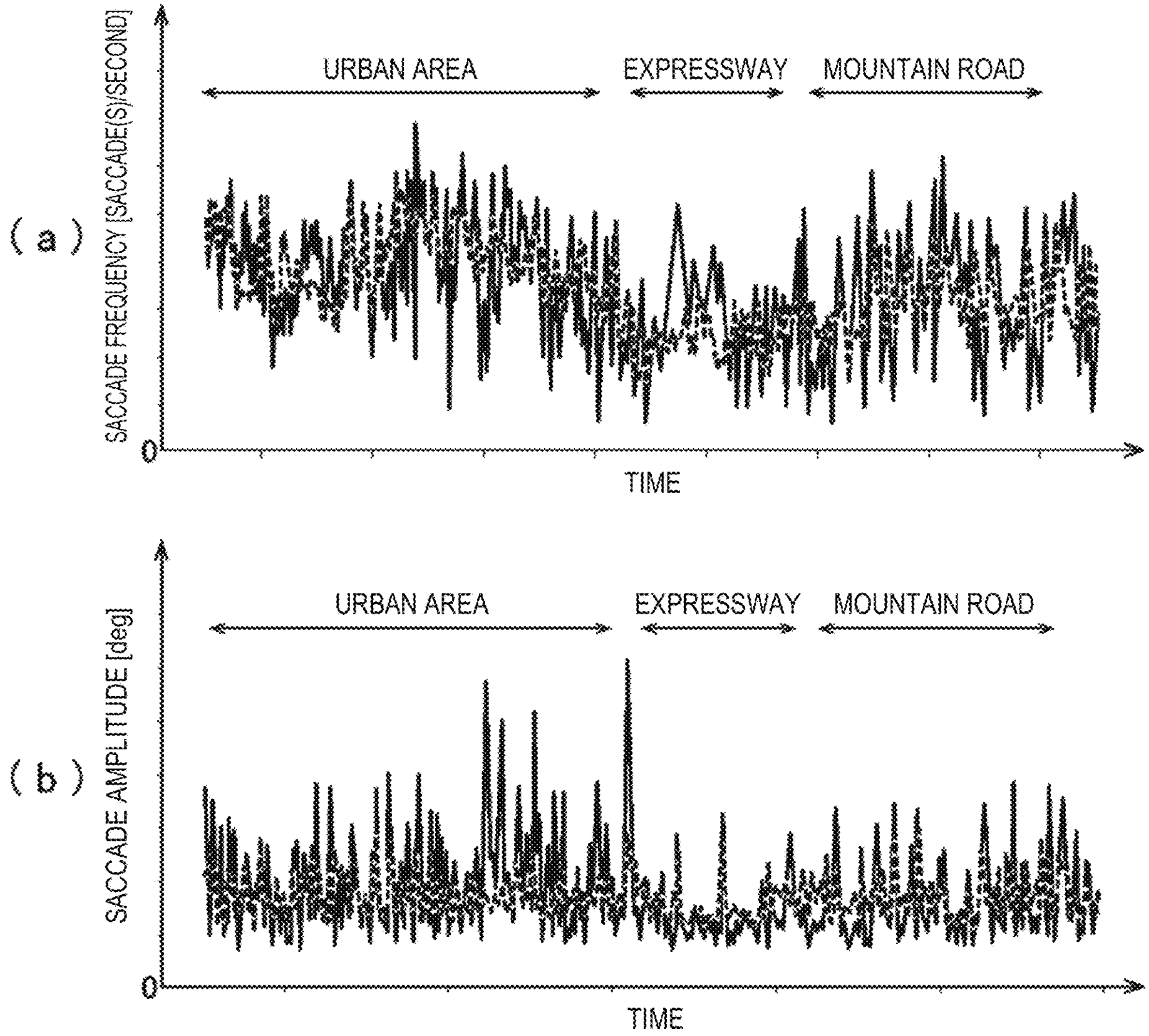
FIG. 8 illustrates time charts which indicate comparisons between actual measurement values of the saccade frequency and amplitude and prediction values by the visual line model, according to the embodiment.

The present inventors monitored drivers in the healthy state to actually drive vehicles and compared actual measurement values of the saccade frequency and amplitude when the drivers traveled in an urban area, an expressway, and a mountain road with the prediction values of the saccade frequency and amplitude which were output from the visual line model configured as described above. FIG. 8 illustrates time charts which indicate comparisons between the actual measurement values of the saccade frequency and amplitude and the prediction values by the visual line model 104, FIG. 8 (*a*) illustrates the comparison about the saccade frequency, and FIG. 8 (*b*) illustrates the comparison about the saccade amplitude. In FIG. 8, solid lines indicate the actual measurement values of the saccade frequency and amplitude, and broken lines indicate the prediction values by the visual line model 104.

As illustrated in FIG. 8, it can be understood that as for each of the saccade frequency and amplitude, a change in a trend of the actual measurement value in a case where a traveling area moves from the urban area, through the expressway, to the mountain road can highly precisely be predicted by the prediction value by the visual line model 104. Further, fine peaks of the saccade frequency and amplitude, which are considered to be mainly due to the head behavior of the driver, are also precisely reproduced by the prediction values by the visual line model 104.

Returning to FIG. 3, based on the actual measurement values of the motion of the visual line of the driver (measured visual line), which are specified from the acquired visual line information, and the visual line prediction values (predicted saccade frequency and predicted saccade amplitude) which are output by the visual line model configured as described above, the controller 10 calculates the visual line abnormality degree which represents the extent that the visual line actual measurement values diverge from the visual line prediction values (visual line abnormality degree calculation 102).

For example, based on the number of saccades in a predetermined time (for example, 30 seconds), the controller 10 calculates the number of saccades for a unit time as the actual measurement value of the saccade frequency. Further, the controller 10 calculates the average value of the saccade amplitudes in a predetermined time (for example, 30 seconds) as the actual measurement value of the saccade amplitude. Furthermore, the controller 10 accumulates two-dimensional data in which a difference between the calculated actual measurement value of the saccade frequency and the prediction value output from the visual line model is set as a first variable and a difference between the calculated actual measurement value of the saccade amplitude and the prediction value output from the visual line model is set as a second variable. The controller 10 calculates the Mahalanobis distance between a newest data point of the two-dimensional data and a centroid (average) of an accumulated data set. Because a correlation is present between the difference between the actual measurement value and the prediction value of the saccade frequency and the difference between the actual measurement value and the prediction value of the saccade amplitude, by using the Mahalanobis distance in such a manner, a divergence degree of the motion of the visual line from the healthy state can be represented by one index. In addition, the controller 10 normalizes the calculated Mahalanobis distance by dividing that by a representative value, which is set in advance, and thereby calculates the visual line abnormality degree. As the representative value, the Mahalanobis distance in a case where the driver exhibits the abnormality sign can be used. That is, when the visual line abnormality degree is one, the driver exhibits the abnormality sign.

Furthermore, the controller 10 accumulates the calculated visual line abnormality degree in a buffer (visual line abnormality degree buffer 106) and acquires a maximum value of the visual line abnormality degree in a latest predetermined time (for example, 60 seconds) from the visual line abnormality degree buffer 106 (maximum value acquisition 108).

Further, the controller 10 inputs the acquired traveling environment information and vehicle state information to a driving operation prediction model 114 and calculates a prediction value of the driving operation (driving operation prediction value) of the driver in the healthy state. As feature amounts representing the driving operation, for example, an operation amount of the steering wheel (steering angle) and operation amounts of the accelerator pedal and the brake pedal (accelerator-pedal pedaling amount and brake-pedal pedaling amount) can be used.

The driving operation prediction model 114 is configured to output the driving operation prediction value of the driver in the healthy state when the traveling environment or the vehicle state, which is necessary for the driving operation, is input as a parameter. Specifically, the driving operation prediction model is configured such that when the traveling environment such as the position of a marking lane or an obstacle in the moving direction of the vehicle 1, a vehicle speed limit, or the position or the speed of the preceding vehicle or the vehicle state such as the vehicle speed or the acceleration is input as the parameter, for example, the driving operation prediction model outputs, as the predicted driving operation, the operation amount of the steering wheel which is necessary for traveling at a center of a traveling lane or the operation amounts of the accelerator pedal and the brake pedal for causing the vehicle 1 to follow the preceding vehicle or to travel at the vehicle speed limit.

Based on an actual measurement value of the driving operation of the driver (measured driving operation), which is specified from the acquired driving operation information, and the driving operation prediction value output from the driving operation prediction model 114, the controller 10 calculates the driving operation abnormality degree which represents the extent that the measured driving operation diverges from the predicted driving operation (driving operation abnormality degree calculation).

For example, the controller 10 accumulates two-dimensional data in which a difference between an actual measurement value of the operation amount of the steering wheel and the prediction value output from the driving operation prediction model is set as a first variable and a difference between an actual measurement value of the operation amount of the accelerator pedal or the brake pedal and the prediction value output from the driving operation prediction model is set as a second variable. The controller 10 calculates the Mahalanobis distance between the newest data point of the two-dimensional data and the centroid (average) of an accumulated data set. Because a correlation is present between the difference between the actual measurement value and the prediction value of the operation amount of the steering wheel and the difference between the actual measurement value and the prediction value of a pedal operation amount, by using the Mahalanobis distance in such a manner, a divergence degree of the driving operation from the healthy state can be represented by one index. In addition, the controller 10 normalizes the calculated Mahalanobis distance by dividing that by a representative value, which is set in advance, and thereby calculates the driving operation abnormality degree. As the representative value, the Mahalanobis distance in a case where the driver is in the abnormality sign can be used. That is, when the driving operation abnormality degree is one, the abnormality sign of the driver is present.

Furthermore, the controller 10 accumulates the calculated driving operation abnormality degree in a buffer (driving operation abnormality degree buffer 116) and acquires a maximum driving operation abnormality degree in a latest predetermined time from the driving operation abnormality degree buffer 116 (maximum value acquisition 118).

Further, the controller 10 calculates the traveling risk based on the acquired traveling environment information and vehicle state information (traveling risk calculation 124). The traveling risk represents a possibility of the lane deviation, approach to the obstacle, or the like by a numerical value. For example, settings are made such that the traveling risk=0 in a case where it is predicted that the vehicle 1 will be positioned at a lane center and the distance to the obstacle will be a safe distance (for example, 1 m) or greater after a predetermined time (for example, 2 seconds), the traveling risk becomes closer to 1 as a prediction value of a distance to the lane deviation or of a distance to the obstacle, similarly, at a time after the predetermined time becomes smaller, and the traveling risk=1 in a case where it is predicted that the lane deviation will occur or the distance to the obstacle after the predetermined time will become smaller than a distance limit (for example, 0.3 m). That is, the controller 10 specifies, from the acquired traveling environment information, the position of the marking line on the traveling road in the moving direction of the vehicle 1, the position of the vehicle 1 on the traveling road, and the position and the speed of the obstacle. Further, from the acquired traveling environment information or vehicle state information, the controller 10 specifies the present speed or acceleration of the vehicle 1 and predicts the position of the vehicle 1 at a time after a predetermined time. Furthermore, based on the predicted position of the vehicle 1 and the position of the marking line or the obstacle and the speed, the controller 10 calculates the prediction value of the distance to the lane deviation of the vehicle 1 or of the distance to the obstacle at a time after a predetermined time and calculates the traveling risk based on the calculated prediction value.

Furthermore, the controller 10 accumulates the calculated traveling risk in a buffer (risk buffer 126) and acquires the average value of the traveling risk in a latest predetermined time from the risk buffer 126 (average value acquisition 128).

The controller 10 calculates the comprehensive abnormality degree from the acquired maximum value of the visual line abnormality degree, the acquired maximum value of the driving operation abnormality degree, and the acquired average value of the traveling risk (comprehensive abnormality degree calculation 150). For example, the controller 10 sets a three-dimensional vector, which has, as components, the acquired maximum value of the visual line abnormality degree, the acquired maximum value of the driving operation abnormality degree, and the acquired average value of the traveling risk, as a comprehensive abnormality degree vector in a three-dimensional orthogonal coordinate system, in which the maximum value of the visual line abnormality degree, the maximum value of the driving operation abnormality degree, and the average value of the traveling risk are set as axes, and thereby calculates a magnitude of the comprehensive abnormality degree vector as the comprehensive abnormality degree.

Figure 9:
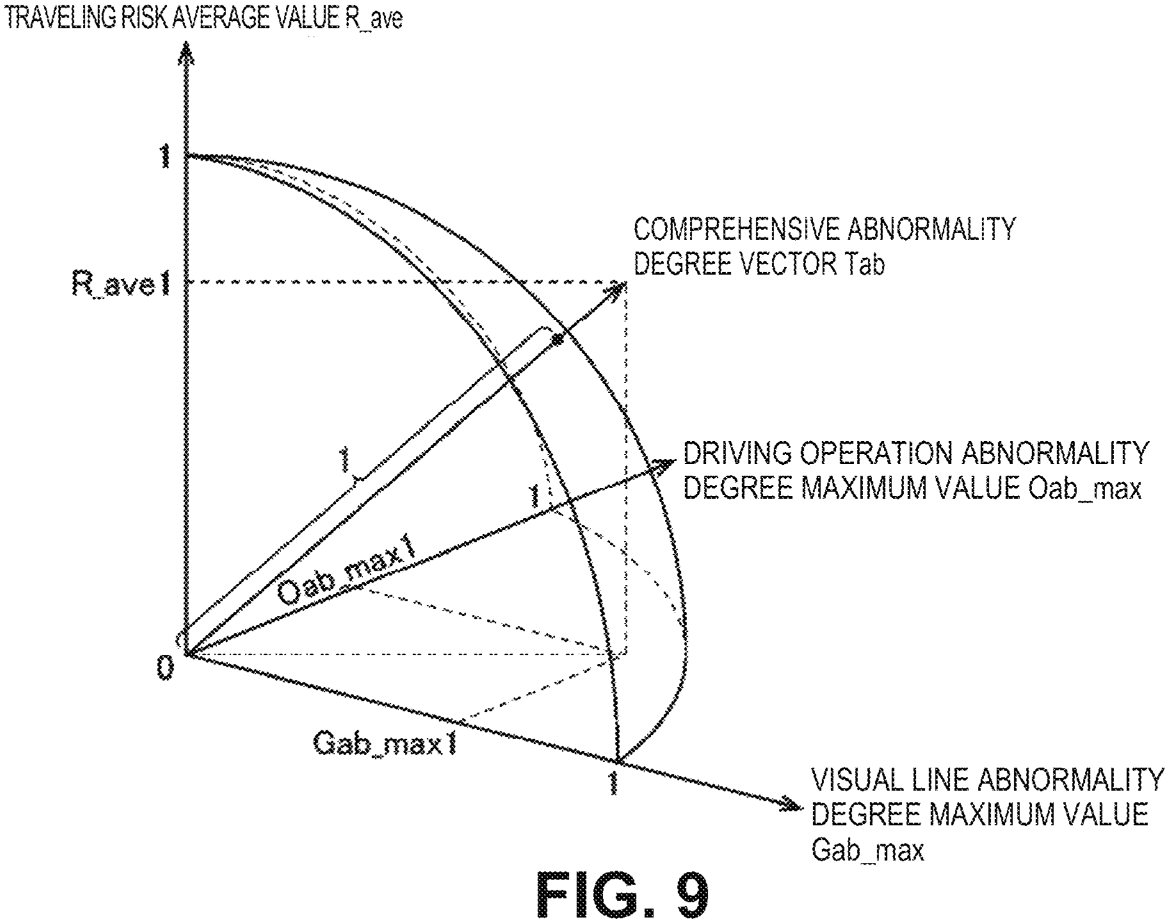
FIG. 9 is a diagram in which a comprehensive abnormality degree in the embodiment is represented by a three-dimensional orthogonal coordinate system in which a visual line abnormality degree, a driving operation abnormality degree, and a traveling risk are set as coordinate axes.

FIG. 9 is a diagram in which the comprehensive abnormality degree is represented by the three-dimensional orthogonal coordinate system in which the visual line abnormality degree, the driving operation abnormality degree, and the traveling risk are set as coordinate axes. As illustrated in FIG. 9, when the acquired maximum value of the visual line abnormality degree is set as Gab_max, the acquired maximum value of the driving operation abnormality degree is set as Oab_max, and the acquired average value of the traveling risk is set as R_ave, the magnitude of a comprehensive abnormality degree vector Tab can be expressed as $(Gab\_max^2+Oab\_max^2+R\_ave^2)^{1/2}$. For example, in the example in FIG. 9, each of a maximum value Gab_max1 of the visual line abnormality degree, a maximum value Oab_max1 of the driving operation abnormality degree, and an average value R_ave1 of the traveling risk is smaller than one, but even in this case, the magnitude of the comprehensive abnormality degree vector Tab is larger than one. Further, when any one of the acquired maximum value of the visual line abnormality degree, the acquired maximum value of the driving operation abnormality degree, and the acquired average value of the traveling risk is one or greater, the comprehensive abnormality degree becomes one or greater.

The controller 10 determines whether or not the calculated comprehensive abnormality degree is a predetermined threshold value or greater (threshold value determination 152). In a case where the magnitude of the comprehensive abnormality degree vector which is obtained as described above is calculated as the comprehensive abnormality degree, the threshold value is one, for example, and a spherical surface with a radius of one corresponds to the threshold value in the example in FIG. 9.

Further, in a case where it is determined, based on the calculated traveling risk, that the traveling risk is rising and reaches one in a predetermined time (for example, five seconds) when a rising rate is maintained, the controller 10 detects a rise of the traveling risk (traveling risk rise detection 122).

Furthermore, in a case where the comprehensive abnormality degree is the threshold value or greater and the rise of the traveling risk is detected, the controller 10 assesses that the abnormality sign of the drive is present. That is, the abnormality sign of the driver is detected (abnormality sign detection 154).

When the abnormality sign is detected, the controller 10 transmits the control signals for causing the driving force source 2, the transmission 3, the brakes 4, and the steering device 5 to appropriately act to the PCM 33, the DSC 34, and the EPS 35 and transmits, to the display 36 and the speaker 37, the control signals for causing the display 36 and the speaker 37 to output desired information. For example, the controller 10 causes the steering wheel to vibrate at a predetermined frequency by the EPS 35 and confirms that the driver is in the abnormality state based on a response of the driver. Further, the controller 10 causes the display 36 to output warning display and confirms that the driver is in the abnormality state based on a response of the driver to the warning display.

Abnormality Sign Detection Process

Figure 10:
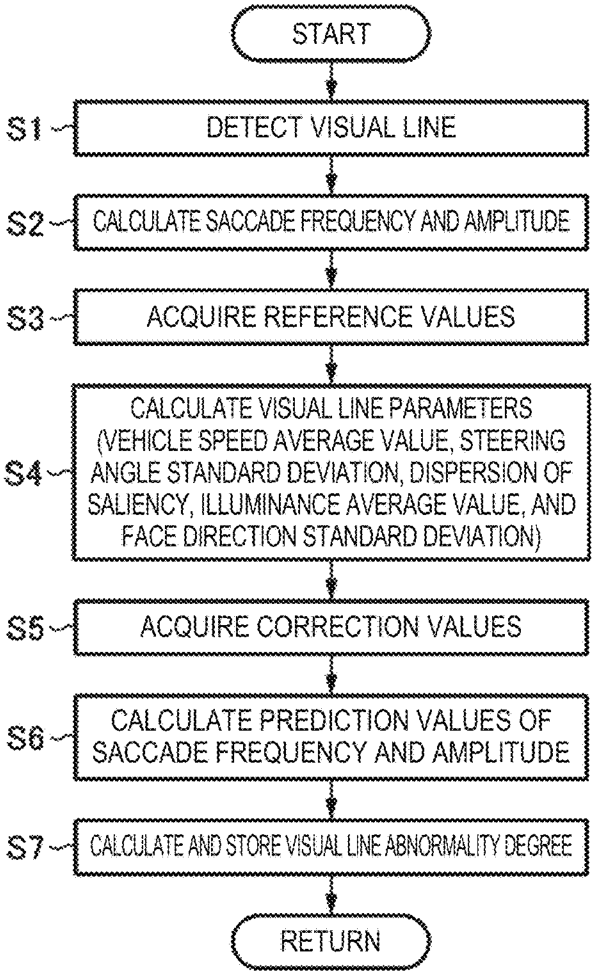
FIG. 10 is a flowchart of a visual line abnormality degree calculation process according to the embodiment.
Figure 11:
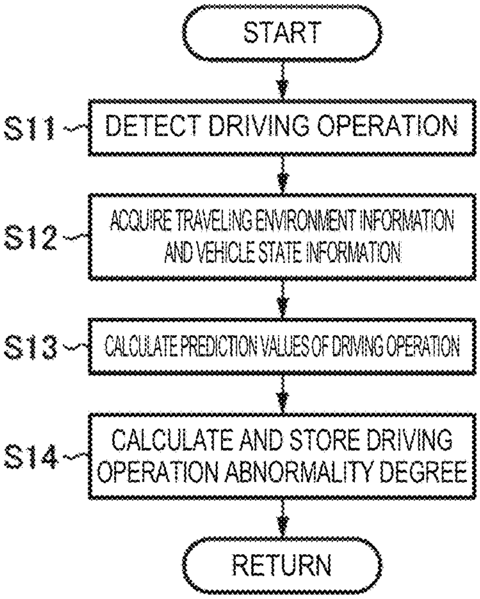
FIG. 11 is a flowchart of a driving operation abnormality degree calculation process according to the embodiment.
Figure 12:
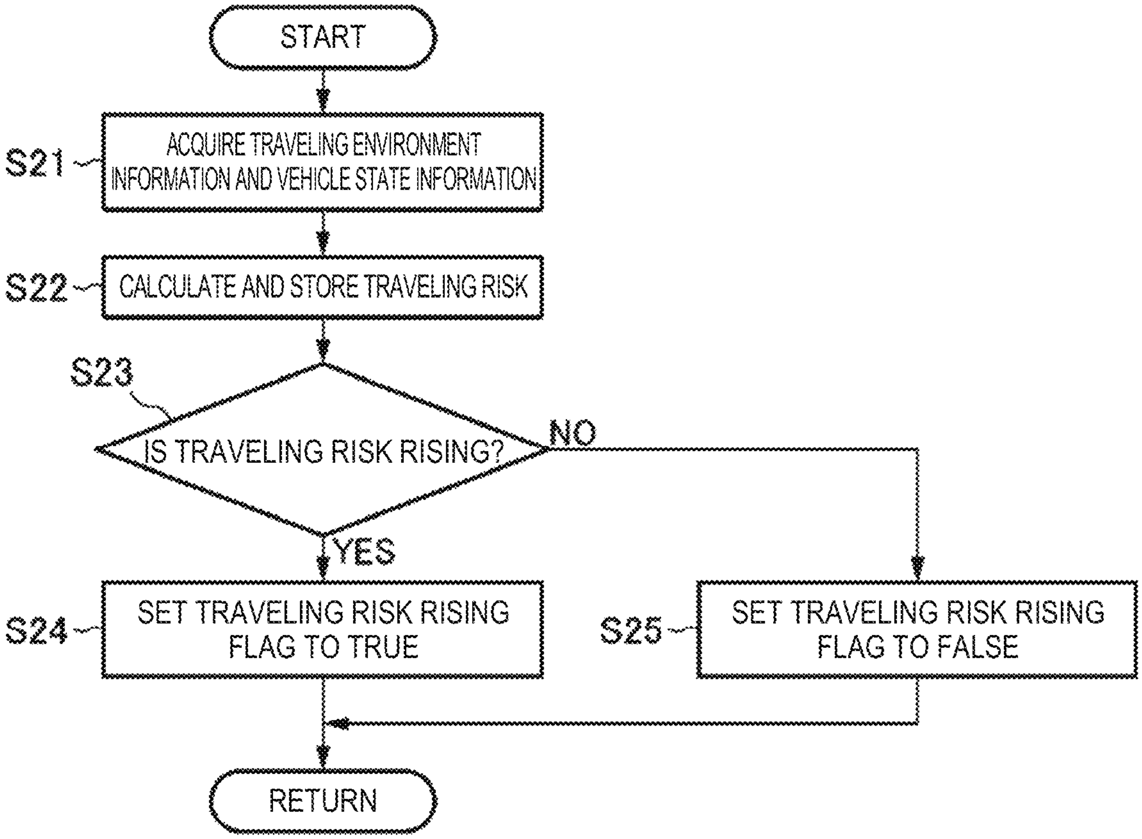
FIG. 12 is a flowchart of a traveling risk calculation process according to the embodiment.
Figure 13:
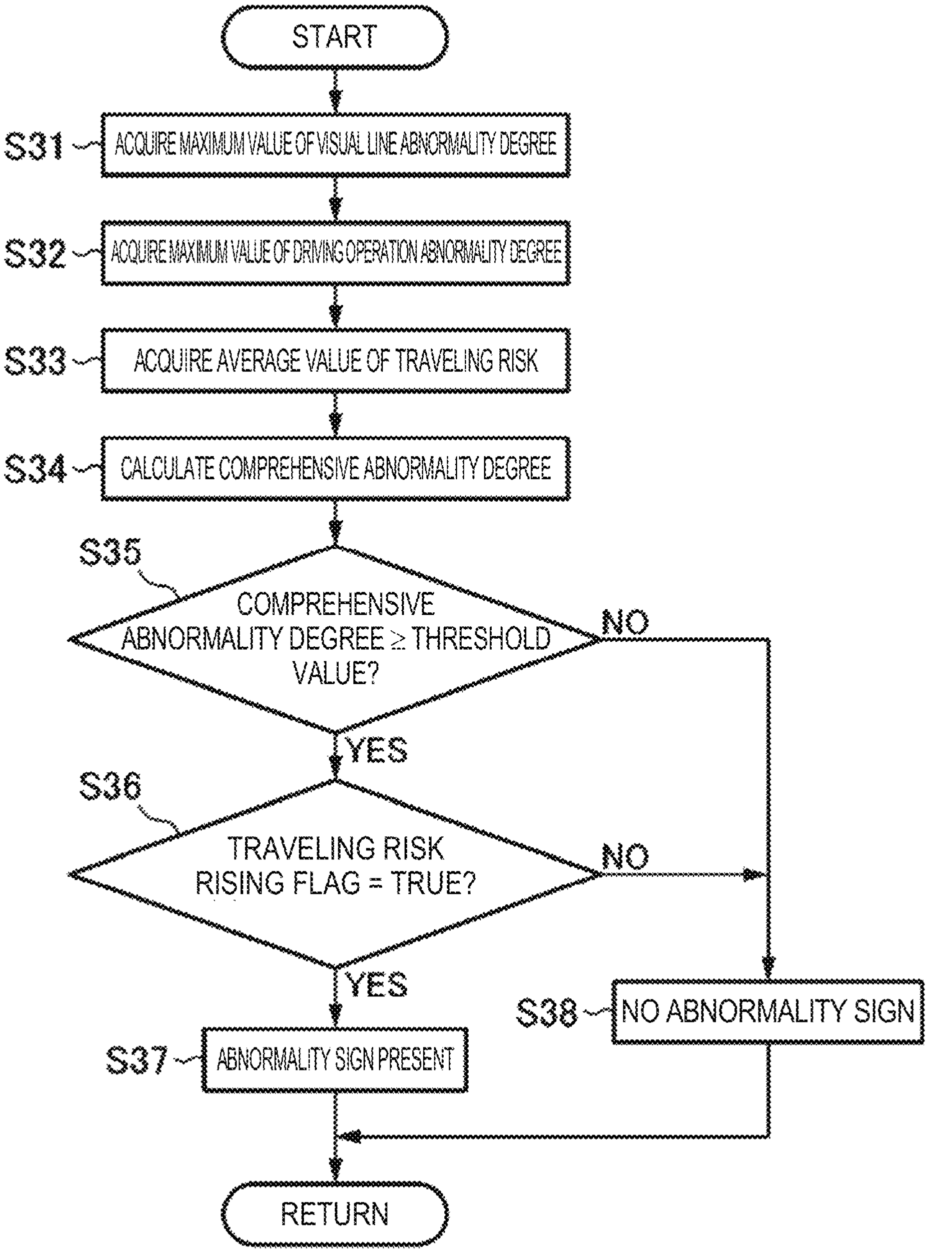
FIG. 13 is a flowchart of an abnormality sign detection process according to the embodiment.

Next, a description will be made, with reference to FIG. 10 to FIG. 13, about a flow of a detection process of the abnormality sign by the driver abnormality sign detection device 100 of the present embodiment. FIG. 10 is a flowchart of a visual line abnormality degree calculation process, FIG. 11 is a flowchart of a driving operation abnormality degree calculation process, FIG. 12 is a flowchart of a traveling risk calculation process, and FIG. 13 is a flowchart of an abnormality sign detection process. The visual line abnormality degree calculation process, the driving operation abnormality degree calculation process, the traveling risk calculation process, and the abnormality sign detection process are started in a case where a power source of the vehicle 1 is turned ON and are in parallel and repeatedly executed by the controller 10 in a predetermined cycle (for example, every 0.05 to 0.2 seconds).

When the visual line abnormality degree calculation process in FIG. 10 is started, the controller 10 detects the visual line of the driver based on the signal received from the in-vehicle camera 32 (step S1). Next, based on the detected visual line of the driver, the controller 10 calculates the actual measurement values of the saccade frequency and amplitude (step S2).

Further, the controller 10 acquires the reference values of the saccade frequency and amplitude in the healthy state of the driver (step S3). The reference values are stored in the memory 10*b* in advance, for example, machine learning is executed for each travel of the vehicle 1, and the reference values thereby reflect individual differences among drivers.

Next, the controller 10 calculates the vehicle speed average value based on the signal received from the vehicle speed sensor 25, calculates the steering angle standard deviation based on the signal received from the steering angle sensor 28, calculates the dispersion of the saliency and the illuminance average value of the traveling environment based on the signal received from the vehicle-outside camera 21, and calculates the face direction standard deviation of the driver based on the signal received from the in-vehicle camera 32 (step S4). That is, the controller 10 calculates the visual line parameters based on information acquired from the visual line parameter information acquisition devices.

Next, the controller 10 inputs the visual line parameters calculated in step S4 to the vehicle state influence model, the traveling environment influence model, and the head behavior influence model and acquires the correction values for correcting the reference values (step S5).

Next, the controller 10 corrects the reference values by using the correction values calculated in step S5 and thereby calculates the prediction values of the saccade frequency and amplitude (step S6).

Next, based on the actual measurement values of the saccade frequency and amplitude which are calculated in step S2 and on the prediction values of the saccade frequency and amplitude which are calculated in step S6, the controller 10 calculates the visual line abnormality degree and stores that in the buffer (step S7). As described above, for example, the controller 10 calculates the Mahalanobis distance between the newest data point of the two-dimensional data, in which the difference between the actual measurement value and the prediction value of the saccade frequency is set as the first variable and the difference between the actual measurement value and the prediction value of the saccade amplitude is set as the second variable, and the centroid (average) of the data set which is accumulated so far. In addition, the controller 10 normalizes the calculated Mahalanobis distance by dividing that by the representative value, which is set in advance, and thereby calculates the visual line abnormality degree. After step S7, the controller 10 finishes the visual line abnormality degree calculation process.

When the driving operation abnormality degree calculation process in FIG. 11 is started, based on the signals received from the steering angle sensor 28, the steering torque sensor 29, the accelerator sensor 30, and the brake sensor 31, the controller 10 detects the driving operation by the driver, specifically, the operation amount of the steering wheel and the operation amounts of the accelerator pedal and the brake pedal (step S11).

Further, based on the signals received from the sensors including the vehicle-outside camera 21, the radar 22, the navigation system 23, the positioning system 24, the vehicle speed sensor 25, the acceleration sensor 26, and the yaw rate sensor 27, the controller 10 acquires the traveling environment information and the vehicle state information (step S12). Then, the controller 10 inputs the information acquired in step S12 to the driving operation prediction model and calculates the prediction values of the driving operation (step S13).

Next, based on the actual measurement values of the driving operation of the driver which are detected in step S11 and on the prediction values of the driving operation which are calculated in step S13, the controller 10 calculates the driving operation abnormality degree and stores that in the buffer (step S14). As described above, for example, the controller 10 calculates the Mahalanobis distance between the newest data point of the two-dimensional data, in which the difference between the actual measurement value and the prediction value of the operation amount of the steering wheel is set as the first variable and the difference between the actual measurement value and the prediction value of the operation amount of the accelerator pedal or the brake pedal is set as the second variable, and the centroid (average) of the data set which is accumulated so far. In addition, the controller 10 normalizes the calculated Mahalanobis distance by dividing that by the representative value, which is set in advance, and thereby calculates the driving operation abnormality degree. After step S14, the controller 10 finishes the driving operation abnormality degree calculation process.

When the traveling risk calculation process in FIG. 12 is started, based on the signals received from the sensors including the vehicle-outside camera 21, the radar 22, the navigation system 23, the positioning system 24, the vehicle speed sensor 25, the acceleration sensor 26, and the yaw rate sensor 27, the controller 10 acquires the traveling environment information and the vehicle state information (step S21).

Next, based on the traveling environment information and the vehicle state information which are acquired in step S21, the controller 10 calculates the traveling risk and stores that in the buffer (step S22). As described above, for example, the controller 10 specifies, from the acquired traveling environment information, the position of the marking line on the traveling road in the moving direction of the vehicle 1, the position of the vehicle 1 on the traveling road, and the position and speed of the obstacle. Further, from the acquired traveling environment information or vehicle state information, the controller 10 specifies the present speed or acceleration of the vehicle 1 and predicts the position of the vehicle 1 at a time after the predetermined time. Furthermore, based on the predicted position of the vehicle 1 and the position of the marking line or the obstacle and the speed, the controller 10 calculates the prediction value of the distance to the lane deviation of the vehicle 1 or of the distance to the obstacle at a time after the predetermined time and calculates the traveling risk based on the calculated prediction value.

Next, based on the traveling risk calculated in step S22, the controller 10 determines whether or not the traveling risk is rising (step S23). As described above, for example, in a case where it is determined that the traveling risk is rising and reaches one in the predetermined time when the rising rate is maintained, the controller 10 determines that the traveling risk is rising.

As a result, in a case where it is determined that the traveling risk is rising (Yes in step S23), that is, a case where the controller 10 detects a rise of the traveling risk, the controller 10 sets a traveling risk rising flag to TRUE (step S24). On the other hand, in a case where it is not determined that the traveling risk is rising (No in step S23), the controller 10 sets the traveling risk rising flag to FALSE (step S25). After a process of step S24 or S25, the controller 10 finishes the traveling risk calculation process.

When the abnormality sign detection process in FIG. 13 is started, the controller 10 acquires the maximum value of the visual line abnormality degree in the latest predetermined time (for example, 60 seconds) from the visual line abnormality degree buffer (step S31).

Further, the controller 10 acquires the maximum value of the driving operation abnormality degree in the latest predetermined time from the visual line abnormality degree buffer (step S32).

Furthermore, the controller 10 acquires the average value of the traveling risk in the latest predetermined time from the risk buffer (step S33).

Next, the controller 10 calculates the comprehensive abnormality degree from the acquired maximum value of the visual line abnormality degree, the acquired maximum value of the driving operation abnormality degree, and the acquired average value of the traveling risk (step S34). As described above, for example, the controller 10 sets the three-dimensional vector, which has, as the components, the acquired maximum value of the visual line abnormality degree, the acquired maximum value of the driving operation abnormality degree, and the acquired average value of the traveling risk, as the comprehensive abnormality degree vector in the three-dimensional orthogonal coordinate system, in which the maximum value of the visual line abnormality degree, the maximum value of the driving operation abnormality degree, and the average value of the traveling risk are set as the axes, and thereby calculates the comprehensive abnormality degree vector and its magnitude as the comprehensive abnormality degree.

Next, the controller 10 determines whether or not the comprehensive abnormality degree calculated in step S34 is the predetermined threshold value or greater (step S35).

In a case where it is determined that the comprehensive abnormality degree is the predetermined threshold value or greater (Yes in step S35), the controller 10 determines whether or not the traveling risk rising flag is set to TRUE (step S36).

In a case where it is determined that the traveling risk rising flag is set to TRUE (Yes in step S36), the controller 10 assesses that the abnormality sign of the driver is present. That is, the abnormality sign of the driver is detected (step S37).

On the other hand, in a case where it is not determined that the comprehensive abnormality degree is the predetermined threshold value or greater in step S35 (that is, a case where the comprehensive abnormality degree is smaller than the threshold value) (No in step S35) or in a case where it is not determined that the traveling risk rising flag is set to TRUE in step S36 (that is, a case where the traveling risk rising flag is set to FALSE) (No in step S36), the controller 10 assesses that the abnormality sign of the driver is absent. That is, the abnormality sign of the driver is not detected (step S38). After a process of step S37 or S38, the controller 10 finishes the abnormality sign detection process.

Note that in the above-described embodiment, a description is made about a case where other than the saliency distribution in the visual field of the driver, as the visual line parameters, the operation amount of the steering wheel of the vehicle 1, the vehicle speed, the illuminance around the vehicle 1, and the direction of the face of the driver are used, but any one or a plurality of those visual line parameters may be used.

Further, in the above-described embodiment, a description is made about a case where the visual line abnormality degree and the driving operation abnormality degree are calculated by using the Mahalanobis distance, but the visual line abnormality degree and the driving operation abnormality degree may be obtained by another calculation method. For example, the differences between the respective actual measurement values and prediction values of the saccade frequency and amplitude are normalized, a value is composed of the normalized differences, and the composed value may thereby be used as the visual line abnormality degree. For example, the differences between the respective actual measurement values and prediction values of the operation amount of the steering wheel and the operation amount of the pedal are normalized, a value is composed of the normalized differences, and the composed value may thereby be used as the driving operation abnormality degree.

Further, in the above-described embodiment, a description is made about a case where the feature amounts representing the motion of the visual line, the saccade frequency and amplitude are used, but either one of the saccade frequency and amplitude may be used.

Further, in the above-described embodiment, a description is made about a case where feature amounts representing the driving operation, the operation amounts of the steering wheel, the accelerator pedal, and the brake pedal are used, but any one or two of the operation amounts of the steering wheel, the accelerator pedal, and the brake pedal may be used.

Further, in the above-described embodiment, a description is made about a case where the three-dimensional vector which has, as the components, the maximum value of the visual line abnormality degree, the maximum value of the driving operation abnormality degree, and the average value of the traveling risk is set as the comprehensive abnormality degree vector and the magnitude of the comprehensive abnormality degree vector is calculated as the comprehensive abnormality degree, but the comprehensive abnormality degree may be obtained by another calculation method. For example, the total sum or average value of the maximum value of the visual line abnormality degree, the maximum value of the driving operation abnormality degree, and the average value of the traveling risk may be calculated as the comprehensive abnormality degree.

Working and Effects

Next, a description will be made about working and effects of the driver abnormality sign detection device 100 of the above-described present embodiment.

Because the controller 10 acquires predetermined reference values of the saccade frequency and/or amplitude of the driver, calculates the dispersion of a section including a peak of the saliency in the saliency distribution in the visual field of the driver based on the image data acquired from the vehicle-outside camera 21, corrects the reference values with the correction values acquired based on the dispersion of the section including the peak of the saliency, and thereby calculates the prediction values of the saccade frequency and/or amplitude, without calculating saliency distribution data with high resolution as in a case where the agreement degree between the direction of the visual line and the region with high saliency is specified, the prediction value of the motion of the visual line in consideration of the influence of the saliency distribution on the motion of the visual line of the driver can be obtained. Accordingly, even with limited computation resources, how much the actual measurement value of the motion of the visual line diverges from the prediction value of the motion of the visual line of the driver in the healthy state can accurately be grasped, and the abnormality sign of the driver can more highly precisely be detected based on a grasped state of the motion of the visual line.

Further, because the correction values are set so as to correct the reference values further in a direction in which the reference values increase as the dispersion of the section including the peak of the saliency becomes larger, the prediction value of the motion of the visual line in consideration of a tendency in which saccades of the driver increase in a case where the dispersion of the saliency becomes larger can be obtained. Accordingly, the abnormality sign of the driver can highly precisely be detected.

Further, because the correction value is set so as to correct the reference value further in a direction in which the reference value of the saccade frequency increases as the dispersion of the section including the peak of the saliency becomes larger and the controller 10 corrects the reference value of the saccade frequency with the correction value and thereby calculates the prediction value of the saccade frequency, the prediction value of the motion of the visual line in consideration of a tendency in which the saccade frequency of the driver increases in a case where the dispersion of the saliency becomes larger can be obtained. Accordingly, the abnormality sign of the driver can highly precisely be detected.

Further, because the controller 10 accumulates the two-dimensional data, in which the difference between the actual measurement value and the prediction value of the saccade frequency is set as the first variable and the difference between the actual measurement value and the prediction value of the saccade amplitude is set as the second variable, and calculates the visual line abnormality degree based on the Mahalanobis distance between the newest data point of the two-dimensional data and the centroid of a set of the accumulated two-dimensional data, the divergence degree of the motion of the visual line from the healthy state can comprehensively be represented by one index.

Consequently, even at a sufficiently early stage before the driver reaches the abnormality state where driving is difficult, such as a stage at which lowering of the driving functions of the driver cannot be detected only with either one of the saccade frequency and amplitude, the abnormality sign can early and highly precisely be detected.

The scope of the invention is indicated by the appended claims, rather than the foregoing description.

REFERENCE SIGNS LIST

1 vehicle
10 controller
10*a* processor
10*b* memory
100 driver abnormality sign detection device
21 vehicle-outside camera
22 radar
23 navigation system
24 positioning system
25 vehicle speed sensor
26 acceleration sensor
27 yaw rate sensor
28 steering angle sensor
29 steering torque sensor
30 accelerator sensor
31 brake sensor
32 in-vehicle camera
33 PCM
34 DSC
35 EPS
36 display
37 speaker

The invention claimed is:

1. A driver abnormality sign detection device detecting an abnormality sign of a driver driving a vehicle, the driver abnormality sign detection device comprising:

a control circuit configured to detect presence or absence of the abnormality sign of the driver based on visual line information acquired from a visual line detector and on image data acquired from a vehicle-outside camera, wherein the control circuit is configured to acquire a reference saccade frequency and/or a reference saccade amplitude of the driver, calculate dispersion of a section including a peak of saliency in a saliency distribution in a visual field of the driver based on the image data, acquire correction values for correcting the reference saccade frequency and/or the reference saccade amplitude based on the dispersion of the section including the peak of the saliency, calculate a predicted saccade frequency and/or a predicted saccade amplitude by correcting the reference saccade frequency and/or the reference saccade amplitude with the correction values, calculate a visual line abnormality degree which represents an extent that a measured saccade frequency and/or a measured saccade amplitude based on the visual line information diverge from the predicted saccade frequency and/or the predicted saccade amplitude, and detect, based on the visual line abnormality degree, presence or absence of the abnormality sign of the driver.

2. The driver abnormality sign detection device according to claim 1, wherein the correction values are set to correct the reference saccade frequency and/or the reference saccade amplitude further in a direction in which the reference saccade frequency and/or the reference saccade amplitude increase as the dispersion of the section including the peak of the saliency becomes larger.

3. The driver abnormality sign detection device according to claim 2, wherein the correction value is set to correct the reference saccade frequency further in a direction in which the reference saccade frequency increases as the dispersion of the section including the peak of the saliency becomes larger, and the control circuit is configured to acquire the reference saccade frequency and calculate the predicted saccade frequency by correcting the reference saccade frequency with the correction value.

4. The driver abnormality sign detection device according to claim 3, wherein the control circuit is configured to acquire both the reference saccade frequency and/or the reference saccade amplitude of the driver, calculate both the predicted saccade frequency and the predicted saccade amplitude by correcting the reference saccade frequency and the reference saccade amplitude with the correction values, accumulate two-dimensional data in which a difference between the measured saccade frequency and the predicted saccade frequency is set as a first variable and a difference between the measured saccade amplitude and the predicted saccade amplitude is set as a second variable, and calculate the visual line abnormality degree based on a Mahalanobis distance between a newest data point of the two-dimensional data and a centroid of a set of the accumulated two-dimensional data.

5. The driver abnormality sign detection device according to claim 2, wherein the control circuit is configured to acquire predetermined reference values of both the saccade frequency and the saccade amplitude of the driver, calculate both the predicted saccade frequency and the predicted saccade amplitude by correcting the reference saccade frequency and the reference saccade amplitude with the correction values, accumulate two-dimensional data in which a difference between the measured saccade frequency and the predicted saccade frequency is set as a first variable and a difference between the measured saccade amplitude and the predicted saccade amplitude is set as a second variable, and calculate the visual line abnormality degree based on a Mahalanobis distance between a newest data point of the two-dimensional data and a centroid of a set of the accumulated two-dimensional data.

6. The driver abnormality sign detection device according to claim 1, wherein the control circuit is configured to acquire both the reference saccade frequency and reference saccade amplitude of the driver, calculate both the predicted saccade frequency and the predicted saccade amplitude by correcting the reference saccade frequency and the reference saccade amplitude with the correction values, accumulate two-dimensional data in which a difference between the measured saccade frequency and the predicted saccade frequency is set as a first variable and a difference between the measured saccade amplitude and the predicted saccade amplitude is set as a second variable, and calculate the visual line abnormality degree based on a Mahalanobis distance between a newest data point of the two-dimensional data and a centroid of a set of the accumulated two-dimensional data.

7. A non-transitory computer readable storage device having computer readable instructions that when executed by circuitry cause the circuitry to:

acquire a reference saccade frequency and/or a reference saccade amplitude of the driver, calculate dispersion of a section including a peak of saliency in a saliency distribution in a visual field of the driver based on image data from a vehicle-outside camera, acquire correction values for correcting the reference saccade frequency and/or the reference saccade amplitude based on the dispersion of the section including the peak of the saliency, calculate a predicted saccade frequency and/or a predicted saccade amplitude by correcting the reference saccade frequency and/or the reference saccade amplitude with the correction values, calculate a visual line abnormality degree which represents an extent that a measured saccade frequency and/or a measured saccade amplitude based on visual line information from visual line information detector diverge from the predicted saccade frequency and/or the predicted saccade amplitude, and detect, based on the visual line abnormality degree, presence or absence of the abnormality sign of the driver.

* * * * *